US011276242B2

(12) United States Patent
Bakken et al.

(10) Patent No.: US 11,276,242 B2
(45) Date of Patent: Mar. 15, 2022

(54) METHOD AND SYSTEM FOR PRACTICING GROUP FORMATIONS USING AUGMENTED REALITY

(71) Applicants: David Bakken, San Jose, CA (US); Kristian Bakken, Vacaville, CA (US); Lianshi Gan, Daly City, CA (US); Samuel Lau, San Francisco, CA (US); Matthew Morin, Seattle, WA (US); Sanjana Shetty, Cupertino, CA (US)

(72) Inventors: David Bakken, San Jose, CA (US); Kristian Bakken, Vacaville, CA (US); Lianshi Gan, Daly City, CA (US); Samuel Lau, San Francisco, CA (US); Matthew Morin, Seattle, WA (US); Sanjana Shetty, Cupertino, CA (US)

( * ) Notice: Subject to any disclaimer, the term of this patent is extended or adjusted under 35 U.S.C. 154(b) by 0 days.

(21) Appl. No.: 17/221,054

(22) Filed: Apr. 2, 2021

(65) Prior Publication Data
US 2021/0312714 A1 Oct. 7, 2021

Related U.S. Application Data

(60) Provisional application No. 63/005,898, filed on Apr. 6, 2020.

(51) Int. Cl.
*G06T 19/00* (2011.01)
(52) U.S. Cl.
CPC .................. *G06T 19/006* (2013.01)
(58) Field of Classification Search
None
See application file for complete search history.

(56) References Cited

U.S. PATENT DOCUMENTS

| | | | |
|---|---|---|---|
| 6,917,370 B2 | 7/2005 | Benton | |
| 2003/0227453 A1* | 12/2003 | Beier | A63B 24/0021 345/419 |
| 2011/0237331 A1* | 9/2011 | Doucet | A63F 13/10 463/32 |

(Continued)

OTHER PUBLICATIONS

Ultimate Drill Book, "UDBapp Interface Overview", Jul. 17, 2017, URL:https://www.youtube.com/watch?v=MmpnQ_Q4nEE (Year: 2017).*

(Continued)

*Primary Examiner* — David H Chu
(74) *Attorney, Agent, or Firm* — Houda El-Jarrah; Bold IP, PLLC

(57) ABSTRACT

An application for use with a mobile computing device is described that enables group members of a group activity to view the positions of each member in one or more formations for the group activity. The application enables the user to select a formation for viewing and practicing in any location, whether indoors or outdoors and with or without other group members of the group activity. The application allows the user to toggle between a top-down view and an augmented reality view. The augmented reality view enables a user to view graphical indicators of each position of the user, whereby the graphical indicators are superimposed on a user's computing device in the real user environment. The augmented reality view provides a user with a better understanding of his or her positions in a real-world environment.

13 Claims, 22 Drawing Sheets

(56) References Cited

U.S. PATENT DOCUMENTS

| | | | | |
|---|---|---|---|---|
| 2012/0105475 | A1* | 5/2012 | Tseng | G01S 19/13 345/633 |
| 2014/0055491 | A1* | 2/2014 | Malamud | G01C 21/3697 345/633 |
| 2014/0063061 | A1* | 3/2014 | Reitan | G09G 3/003 345/633 |
| 2014/0292812 | A1* | 10/2014 | Fink | G03F 7/70116 345/633 |
| 2019/0026956 | A1* | 1/2019 | Gausebeck | H04N 13/10 |
| 2019/0342249 | A1* | 11/2019 | Holmes | H04L 51/32 |

OTHER PUBLICATIONS

Ultimate Drill Book, "UDBapp Settings Overview", Jul. 17, 2017, URL:https://www.youtube.com/watch?v=EOkfdYo05al (Year: 2017).*

Pyware, "Pyware 3D Version 9.1 Developer Preview", May 11, 2017, URL: https://www.youtube.com/watch?v=Sunv0UBcaNY (Year: 2017).*

Niantic, "Codename: Neon—Real World Multiplayer AR Demo", Jun. 28, 2018, Youtube, URL: https://www.youtube.com/watch?v=dO1NpT2SSX4 (Year: 2018).*

BuildLineup.com, "Football Formation Creator With Subs—Make Your Own Soccer Team", Jun. 3, 2017, URL: https://web.archive.org/web/20170603221228/https://www.buildlineup.com/ (Year: 2017).*

Pyware Professional 3D Software, www.pyware.com, https://www.pyware.com/3d/, [date accessed: Mar. 24, 2021].

Pyware 3D Viewer App,www.pyware.com/viewer-app, https://www.pyware.com/viewer-app/ [date accessed Mar. 24, 2021].

Ultimate Drill Book, ultimatedrillbook.com, http://ultimatedrillbook.com/udbapp/ [dated accessed: Mar. 24, 2021].

* cited by examiner

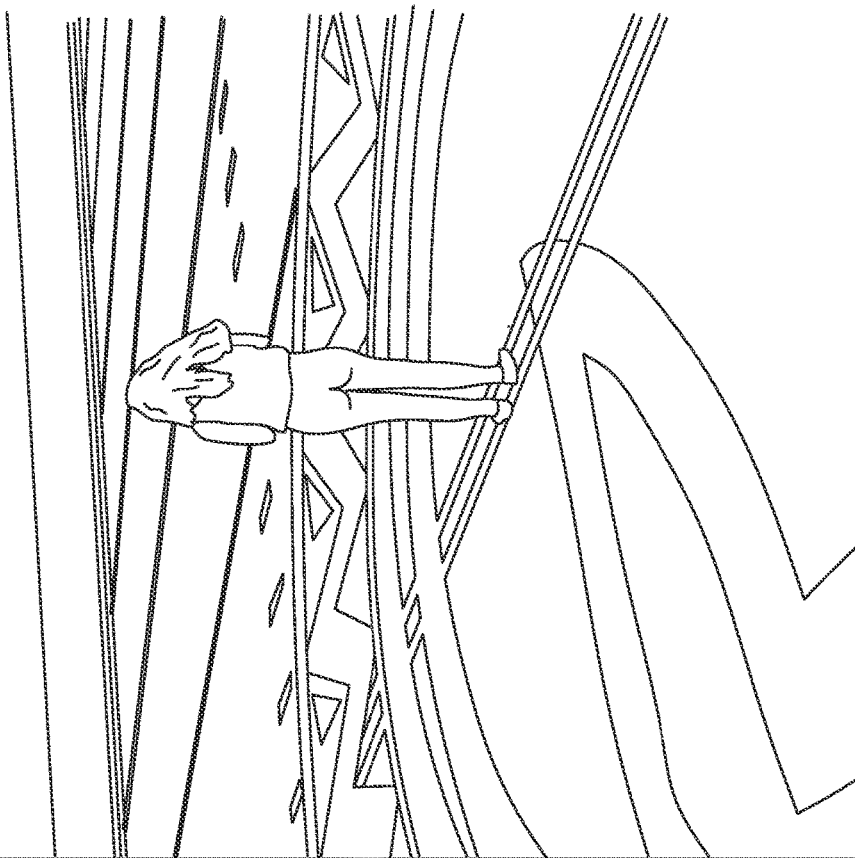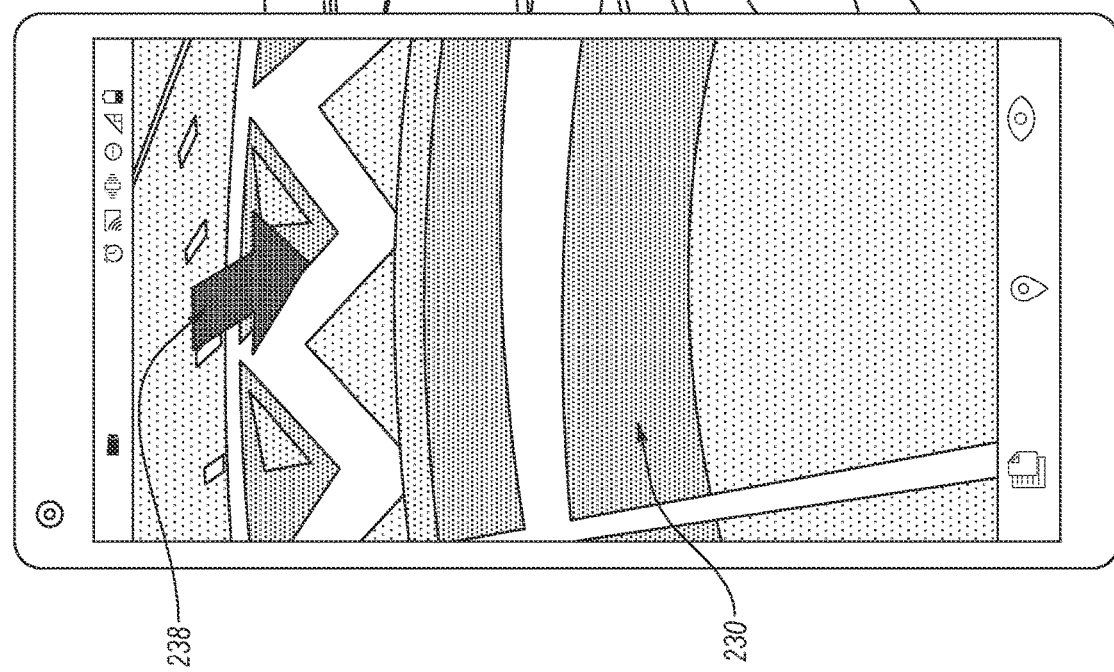
FIG. 13

METHOD AND SYSTEM FOR PRACTICING GROUP FORMATIONS USING AUGMENTED REALITY

CROSS-REFERENCE TO RELATED APPLICATIONS

This application is a non-provisional application which claims priority to U.S. Provisional Patent Application No. 63/005,898, which was filed on Apr. 6, 2020, which is incorporated by reference in its entirety.

FIELD OF THE DISCLOSURE

This disclosure relates generally to a system and method for viewing and practicing group formations, such as, but not limited to, marching band, sports, theater, and dance, in which the system and method include a mobile application that incorporates augmented reality to allow the user to practice the group formation as if the user is practicing with the whole group while in a real-world environment.

BACKGROUND

Group based physical activities such as marching band, sports, theater, and dance are known to involve a great deal of creativity, education, talent, and intellect and are very beneficial to the sense of confidence and well-being of the participants. Many people enjoy watching and participating in such group based physical activities. Group based physical activities and the creation of group formations help with goal-oriented thinking and achieving the best results for the group. Group formations are defined sets of positions and movements for each member of the group at a given point in time for a particular routine. Group-based physical activities such as marching band, sports, theater, and dance all use group formations to strategize and organize themselves to achieve their overall purpose. A large amount of time and preparation goes into learning and mastering formations individually. The performance quality of a group is reliant on each person's sensitivity to the movements and positions of their group members. Mastery of one's position and transitions between each position in the group formation results in artistry and a quality performance.

A reality of group based physical activities is that they require the members to physically attend practices and rehearsals in order to ensure the group performs well together. A very real difficulty with group based physical activities is coordinating the schedules of all the participants. Sometimes participants in the group based activity may miss practice for various reasons or may require extra time to practice. While group time can be spent on helping individuals, there is usually not enough time to spend on every member to master the formations. There is a need to help people to practice on their own and cultivate sensitivity outside of group practices.

Currently, the most common ways for individuals to practice their positional locations and movements in group formations involves either the use of in person instruction or the use of paper or digital handouts (e.g., saved on their computers or other mobile devices) that contain illustrations and descriptions about the group formations. In person instruction requires a teacher to teach the group members the formation, which as noted above, may have limitations in terms of timing, finding a suitable location, having on hand the necessary tools and audiovisual equipment, and various other challenges involved with assembling a group of people together at the same time.

There are some existing software programs that allow individuals to download and view files on their mobile devices related to group formations for practicing marching band formations. Some existing software programs are structured to allow a director or other formation leader to design marching band drill formations (e.g., a type of group formation). Further, there are some limited capabilities whereby such software files are downloadable onto a user's mobile devices and may be viewed using one or more applications that allow the user to view the created drill formation files. Using these software programs, group members and/or instructors can design group formations and may be able to view the saved files with the group formations on their various computing devices. Nevertheless, a problem with existing applications is that they only display the members of the group as individual dots moving as a group on a grid or football field or another location or as cartoon animations on the screen.

These existing methods all fail to help individuals to build sensitivity to the environment around them and to build sensitivity to their location in the group formation with respect to the other group members. Notably, these existing methods do not incorporate the use of augmented reality (AR), which would provide a better way for performers in a group to practice in a real user environment, either with or without one or more members of the group, at any location and at any time.

Accordingly, there is still an unsolved need for an application configured to work on a user's mobile computing device that allows any performer in a group formation to use augmented reality (AR) while practicing his or her steps and routine in any given location, thus providing an improved user interface and user experience.

SUMMARY

In one or more non-limiting embodiments, a system for a group formation viewer application for practicing group formations for a group activity using augmented reality is described in the present description. The system may include a computing device having a display screen, a memory, and one or more processors configured to select a group formation data file on the computing device. The system may be configured to display one or more formations contained in the group formation data file in a top-down view or an augmented reality view responsive to a selection from a user. If the top-down view is selected, displaying the top-down view further comprises displaying a virtual practice location, displaying graphical symbols that represent a position for each group member in a selected formation from the group formation data file in the virtual practice location, and displaying each position of the user for the selected formation in the top-down view in relation to a position for the other group members in the virtual practice location.

If the augmented reality view is selected, displaying the augmented reality view further comprises displaying a user observed viewpoint of a real user environment on the display screen of the computing device. The user observed viewpoint comprises a first-person realistic view of one's surroundings. The augmented reality view display may further comprise displaying a starting position marker on a starting position of the user on the display screen of the computing device as obtained from the selected formation from the group formation data file, tracking a position associated with the user, and displaying a positional graphical indicator for each position associated with the user for the selected formation in the augmented reality view in the real user environment. The system may further include toggling between the augmented reality view and top-down view in response to a selection from the user.

The present description may further comprise a computer implemented method for practicing group formations for a group activity using augmented reality. The computer implemented method may further include receiving a selection for a formation data file on a computing device, whereby the formation data file comprises one or more group formations. The method may further include receiving a selection from a user to display the one or more group formations in a top-down view or in an augmented reality view. If the top-down view is selected, the method may include displaying the top-down view. Displaying the top-down view may further comprise displaying a virtual practice location on a display device of the computing device, whereby the virtual practice location comprises a computer generated image of a virtual location and displaying the virtual practice location with a selected formation of the one or more group formations from the formation data file, whereby each group member in the selected formation is represented as graphical symbols and displayed in the selected formation on the display device of the computing device. The method may further include displaying a positional graphical indicator for the user in the selected formation for each position of the user.

If the augmented reality view is selected, the augmented reality view on the display device of the computing device further comprises displaying a user observed viewpoint of a real user environment using a camera included with or associated with the computing device. The method may further include displaying a starting position marker, whereby the starting position marker is a graphical image superimposed over the real user environment. The process may further include receiving a selection for a coordinate ID, whereby the coordinate ID corresponds with a tracked position of the user throughout the one or more group formations and displaying a first position of the selected coordinate ID. A positional graphical indicator is displayed over the user observed viewpoint, whereby the positional graphical indicator marks a position of the user in the selected group formation, and upon selection by the user to display a subsequent position of the selected coordinate ID, displaying the subsequent position of the selected coordinate ID and the user in the selected formation. The method may further include toggling between the augmented reality view and the top-down view whereby a position of the selected coordinate ID is provided in either the augmented reality view or the top-down view for each formation of the one or more formations.

Other aspects and advantages of the invention will be apparent from the following description and the appended claims.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 13 is a pictorial illustration of an example display screen for displaying a position indicator for a first position of a user in a group formation while using the augmented reality view in accordance with an illustrative embodiment.

DETAILED DESCRIPTION

Figure 1:
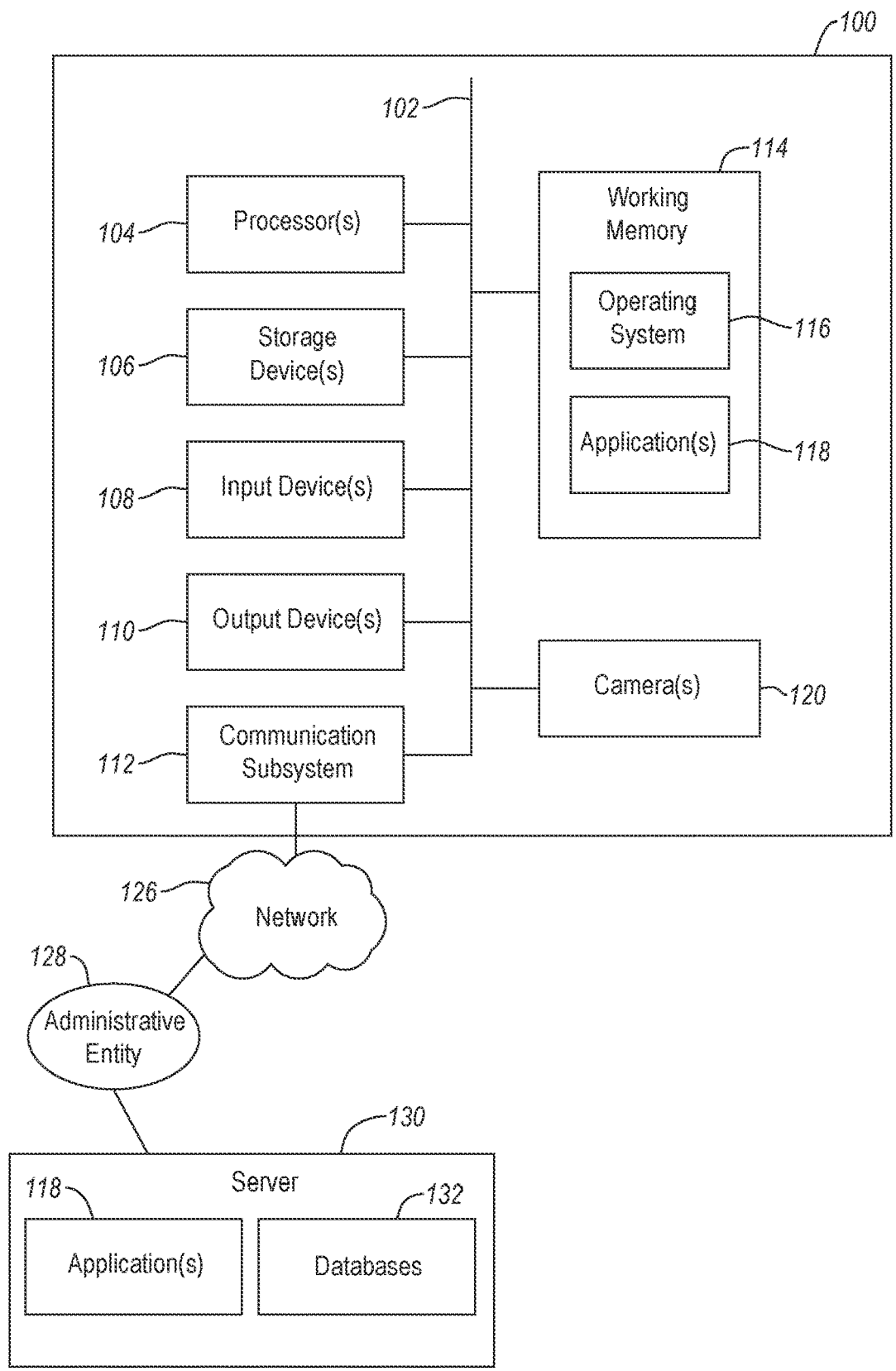
FIG. 1 depicts an exemplary computer system incorporating various components of an exemplary computing device in accordance with one or more illustrative embodiment.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with; and/or in the context of other particular aspects and embodiments of the invention; and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

Group-based physical activities require the members to physically attend practices and it is difficult to coordinate everyone's schedules. A well-known group activity is marching band, which involves a number of group formations (also referred to as drill formations for a marching band). In marching band drill formations, the group of members are required to play musical instruments on a field or another location (e.g., indoor court or arena) while also moving in an artistic and coordinated way into various formations. The marching band members regularly have to practice their formations and moving from one position to the next so that the group as a whole appears to be well rehearsed, synchronized, and moving easily and fluidly as a team. There are many other types of group activities that also include group formations where several members have various assigned movements that they must perform and execute well so that the group as a whole looks good performing the routine and executes the routine perfectly. Such activities may include, without limitation, dance groups, theater groups, including musicals, plays, or other artistic groups. Sports related activities involving group sports may also include one or more group formations that the team or group must regularly practice, such as a basketball team, football team, soccer team, or any other type of sports team.

An issue with group activities is that it is often difficult to coordinate practice schedules for every member of the group and to find a mutually convenient time to practice with the necessary tools and audiovisual equipment for the group activity. People may sometimes miss practice, which can be an issue for the whole group. Further, individuals in the group formation frequently want extra time to practice the group formation, including if they are having trouble learning and implementing the formations. Group time can be spent on helping individuals, however, there is often not enough time to spend on every member. Accordingly, there is still a need to help people to practice on their own and cultivate sensitivity to the positions of other members in the group as well as to understand the various transitions outside of group practices.

Accordingly, one or more embodiments described in the present description relate to a system and method for a computer-based application available for use on a user's computing device that allows a user to independently practice the user's position and movements for a group formation for one or more group activities. In one or more non-limiting embodiments, the computer-based application that may be available on the user's computing device allows a user to view the positions for all of the other users in the group formation as either graphical symbols or 3D models. Accordingly, the user can use his or her computing device to visualize and to better understand his or her assigned positions and required movements while participating in a group activity that includes group formations. The group formation computer-based application available on the user's computing device may be able to access and run a group formation data file that includes the various information about one or more group formations of interest to the user.

Further, the application allows the user to view the group formation in either a top-down view (e.g., bird's eye view) on the display screen of his or her computing device or in an augmented reality (AR) view. In the top-down view, the user may visually see the entire group formation as a set of symbols with the position of the user in each formation highlighted by an assigned positional graphical indicator (e.g., an arrow). In the augmented reality view, using the camera of the user's computing device, the user is able to view his or her real environment with graphical images superimposed over the user observed real environment. The graphical images represent the position of the user in the group formation so that the user is able to walk or otherwise transition to each position while viewing the application on his or her computing device. Further, the graphical images may include 3D models superimposed over the user observed real environment as displayed on the computing device that represent the positions of all of the other group members.

Advantageously, the one or more embodiments of the group formation application accessible by a user's computing device described in the present description allow a user to practice group formations with or without the other group members. Further, one of the unique and novel features of the group formation computer-based application is that it is able to provide an augmented reality (AR) view to display a user's real world practice environment and the actual positions of the user and other group members in a formation, thus allowing the user to practice and quickly learn their position in a group formation. Accordingly, in the augmented reality view, the group formation computer application can simulate the position of the individual user and all the other group members, so that any number of members can practice their formations without having the whole group present.

Because the group formation application is easily accessible to the user from the user's computing device (e.g., mobile cell phone, tablet, or other computing device), it is more convenient for both members and instructors to learn or instruct group formation because they do not have to carry around multiple sheets of paper with difficult to read pictures of the group formations for the group activity the members are a part of. Further, the computer-based group formation application may be leveraged as a collaborative tool where everyone has access to specific formations which they need to practice and learn. Further details and information about the one or more illustrative embodiments for a group formation application available for use on one's computing device is provided below in association with the corresponding Figures.

Turning to FIG. 1, an exemplary system is illustrated for one or more computing devices and the various exemplary components that may be employed in practicing one or more non-limiting embodiments of the invention as described herein. Computing device 100 may be any type of computing device, including, without limitation, desktop computer as well as mobile computing devices, such as laptop computers, smartphones and mobile phones, tablets, wearable electronic computing devices such as watches or glasses, or any other type of electronic, computing device. In one or more preferred, non-limiting embodiments, computing device 100 may be a hand-held type of computing device, such as tablets and smartphones as noted above. A computing device 100 may be any computing device with an input sensory unit like a camera (e.g., 120) and may also include a display device (e.g., 110). Further, examples of a mobile devices include but are not limited to video game consoles.

FIG. 1 provides a schematic illustration of one embodiment of a computing device 100 that can perform the methods provided by various other embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computing device or system 100 is shown comprising hardware elements that can be electrically coupled via a bus 102 (or may otherwise be in communication, as appropriate). The hardware elements of computing device 100 may include one or more processors 104, including without limitation one or more general-purpose processors and/or one or more special-purpose processors (such as digital signal processing chips, graphics acceleration processors, and/or the like). Computing device 100 may further include one or more input devices 108, which can include without limitation one or more cameras (e.g., such as cameras 120), sensors (including inertial sensors), a mouse, a keyboard, and/or the like. Further, computing device 100 may include one or more output devices 110 such as the device display of a mobile computing device (e.g., as shown in FIGS. 3-24). Furthermore, in some embodiments, an input device 108 and an output device 110 of computing device 100 may be integrated, for example, in a touch screen or capacitive display as commonly found on mobile computing devices as well as desktop computers and laptops.

The computing device 100 may further include (and/or be in communication with) one or more non-transitory storage devices 106, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data storage, including without limitation, various file systems, database structures, and/or the like. Device storage may be used in a number of embodiments discussed herein.

The computing system 100 might also include a communications subsystem 112, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 112 may permit data to be exchanged with a network (e.g., such as network 126), other computer systems, and/or any other devices. In many embodiments, the computer system 100 will further comprise a non-transitory working memory 114, which can include a RAM or ROM device, as described above.

The computing device or system 100 also can comprise software elements, shown as being currently located within the working memory 114, including an operating system 116, device drivers, executable libraries, and/or other code, such as one or more application programs 118, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt computing device 100 to perform one or more operations in accordance with the described methods.

A set of these instructions and/or code might be stored on a computer-readable storage medium, such as the storage device(s) 106 described above. In some cases, the storage medium might be incorporated within a computer system, such as computing device 100. In other embodiments, the storage medium might be separate from computing device 100 (e.g., a removable medium, such as a compact disc or flash drive), and/or provided in an installation package, such that the storage medium can be used to program, configure, and/or adapt a general-purpose computer with the instructions/code stored thereon. These instructions might take the form of executable code, which is executable by the computing device 100 and/or might take the form of source and/or installable code, which, upon compilation and/or installation on the computing device 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computing device 100) to perform methods in accordance with the disclosure. For example, some or all of the procedures of the described methods may be performed by the computing device 100 in response to one or more processors 104 executing one or more sequences of one or more instructions (which might be incorporated into the operating system 116 and/or other code, such as an application program 118) contained in the working memory 114. Such instructions may be read into the working memory 114 from another computer-readable medium, such as one or more of the storage device(s) 106. Merely by way of example, execution of the sequences of instructions contained in the working memory 114 might cause the one or more processors 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 100, various computer-readable media might be involved in providing instructions/code to the one or more processors 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks, such as the storage device(s) 106. Volatile media include, without limitation, dynamic memory, such as the working memory 114. Transmission media may include, without limitation, coaxial cables, copper wire and fiber optics, including the wires that comprise the bus 102, as well as the various components of the communications subsystem 112 (and/or the media by which the communications subsystem 112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals, and/or the like are all examples of carrier waves on which instructions can be encoded in accordance with various embodiments of the invention.

The communications subsystem 112 (and/or components thereof) generally will receive the signals, and the bus 102 then might carry the signals (and/or the data, instructions, etc. carried by the signals) to the working memory 114, from which the one or more processors 104 retrieves and executes the instructions. The instructions received by the working memory 114 may optionally be stored on a non-transitory storage device 106 either before or after execution by the processor(s) 104.

Cameras 120 may be any type of camera known to one of ordinary skill in computing device 100. In some embodiments, there may be a single camera 120 configured to display images on a display device (e.g., output device 110) of computing device 100. In other embodiments, there may be multiple cameras 120 that work together on computing device 100. Further, cameras 120 may include the use of forward facing and/or rear facing cameras. Cameras 120 capture and display images of a real-world environment in one or more embodiments herein. Cameras 120 may capture any type of audiovisual image, including moving video images associated with video functions, and is not restricted to displaying still or static images.

In one or more embodiments, computing device 100 is in communication with one or more networks, such as network 126. Network 126 may include a local area network (LAN), such as a company Intranet, a metropolitan area network (MAN), or a wide area network (WAN), such as the Internet or World Wide Web. Network 126 may be a private network, a public network, or a combination thereof. Network 126 may be any type of network known in the art, including a telecommunications network, a wireless network (including Wi-Fi), and a wireline network. Network 126 may include mobile telephone networks utilizing any protocol or protocols used to communicate among mobile digital computing devices (e.g., computing device 110), such as GSM, GPRS, UMTS, AMPS, TDMA, or CDMA. In one or more non-limiting embodiments, different types of data may be transmitted via network 126 via different protocols. In further non-limiting other embodiments, computing device 100 may act as a standalone device or may operate as a peer machine in a peer-to-peer (or distributed) network environment.

Network 126 may further include a system of terminals, gateways, and routers. Network 126 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

Figure 2:
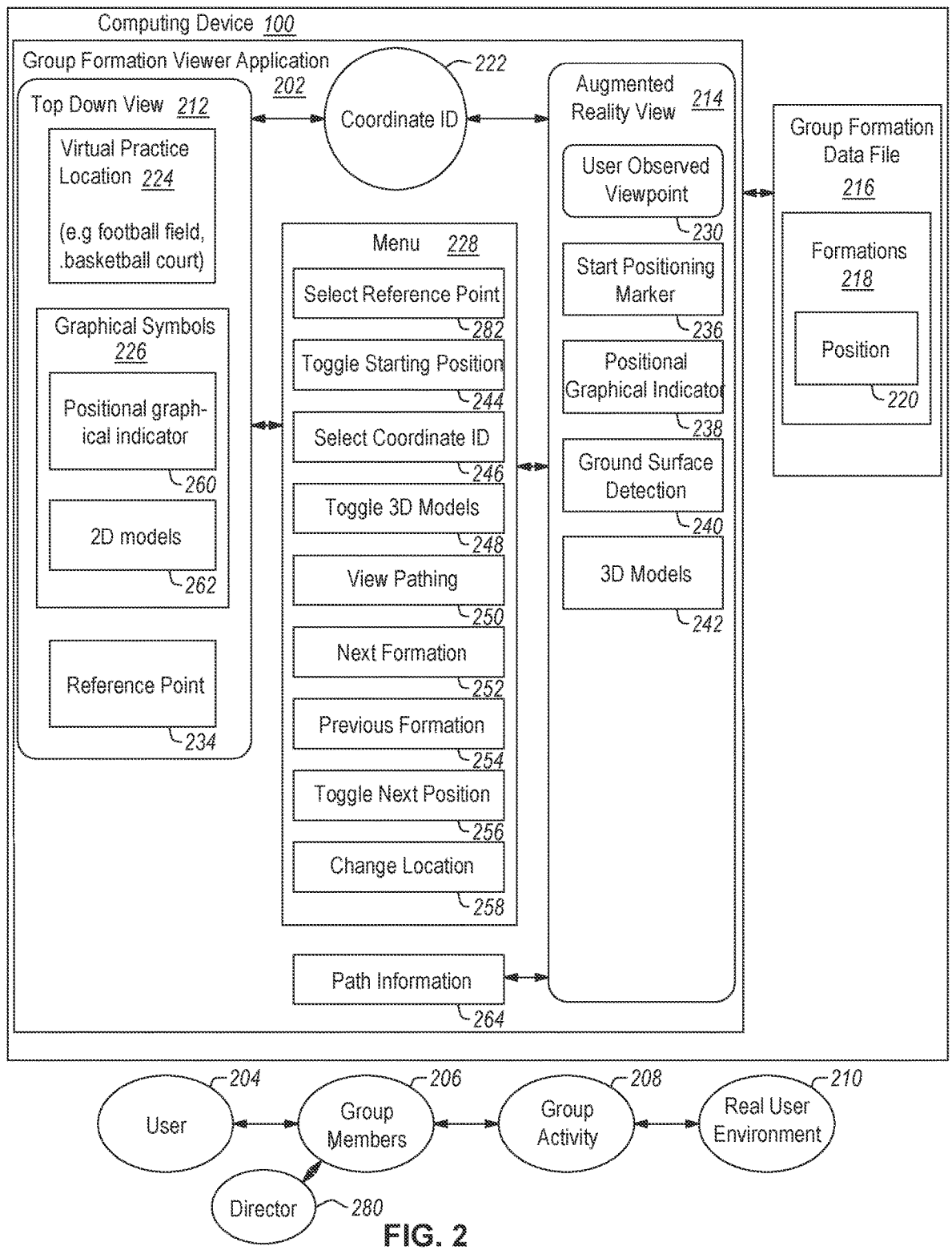
FIG. 2 depicts a block diagram of exemplary components of a computer-based application for selecting either an augmented reality view or a top-down view to view and practice group formations for a group activity in accordance with an illustrative embodiment.

A user, such as user 204 shown in FIG. 2, may be able to download and store on computing device 100 a computer-based application, such as application 118 configured to display information stored in group formation data files (e.g., such as group formation data file 216 shown in FIG. 2) associated with group formations (e.g., such as group formations 218 shown in FIG. 2). Application 118 may be downloadable and installable by a user onto any suitable computing device, such as computing device 100. In some embodiments, application 118 may be preinstalled on computing device 100 by the manufacturer, designer, or other entity. Further, application 118 may be implemented using a web browser via a browser extension or plugin. Application 118 may be innate, built into, or otherwise integrated into existing platforms such as, without limitation thereto, a website, third-party program, iOS™, Android™, Snapchat™, Getty Images™, Instagram™, Facebook™, or any other platform capable of transmitting, receiving, and presenting data.

Application 118 may be stored on computing device 100 and may also be stored or otherwise accessible by server 130 over network 126 by an administrative entity 128. While administrative entity 128 is depicted as a single element communicating over network 126, administrative entity 128 in one or more non-limiting embodiments may be distributed over network 126 in any number of physical locations. Administrative entity 128 may manipulate any software modules and enter commands to server 130 to affect the operation and maintenance of applications 118 on server 130 and as stored on computing device 100. Administrative entity 128 may monitor the operation and function of one or more applications, such as application 118 (e.g., group formation viewer application 202 as shown in FIG. 2).

As noted above, computing devices 100 may be in communication with one or more servers such as server 130 via one or more networks such as network 126. Server 130 may be located at a data center or any other location suitable for providing service to network 126 whereby server 130 may be in one central location or in many different locations in multiple arrangements. Server 130 may comprise a database server such as MySQL® or Maria DB® server. Server 130 may have an attached data storage system storing software applications and data. Server 130 may receive requests and coordinate fulfillment of those requests through other servers. Server 130 may comprise computing systems similar to computing devices 100.

Server 130 may comprise a number of modules that provide various functions related to application 118 (e.g., group formation viewer application 202 as shown in FIG. 2) using one or more computing devices similar to computing device 100. Modules may be in the form of software or computer programs that interact with the operating system of server 130 whereby data collected in one or more databases (e.g., such as databases 132) may be processed by one or more processors within server 130 or computing device 100 as well as in conjunction with execution of one or more other computer programs. Software instructions for implementing the detailed functionality of the modules may be written in or natively understand, including but not limited to, C, C++, Visual Basic, Java, Python, TCL, Perl, Scheme, Ruby.

Databases 132 may be a repository that may be written to and/or read by application 118. Information gathered from application 118 may be stored to databases 132. In one embodiment, databases 132 is a database management system (DBMS) used to allow the definition, creation, querying, update, and administration of a database(s). In the depicted embodiment, databases 132 resides on server 130. In other embodiments, databases 132 may reside on another server, or another computing device, as long as databases 132 is accessible to application 118.

Modules may be configured to receive commands or requests from computing device 100, server 130, and other outside connected devices over network 126. Server 130 may comprise components, subsystems, and modules to support one or more management services for application 118.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention. Accordingly, additional components known to one of ordinary skill in the art, even if not illustrated in FIG. 1, may also be included in computing device 100.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Turning to FIG. 2, a block diagram is shown of various components that may be involved in one or more embodiments of a computer-based group formation viewer application, such as group formation viewer application 202. Group formation viewer application 202 may operate, function, and be in accordance with the application 118 as discussed above with respect to FIG. 1. Group formation application 202 may be a computer-based application that includes modules stored and accessible from computing device 100. As noted above, computing device 100 may be any type of computing device, including without limitation, a mobile phone (e.g., smartphone), tablet, laptop, wearable electronic device, or any other type of computing device. Computing device 100 may utilize any type of operating system 116 known to one of ordinary skill in the art, including, without limitation, iOS™ and Android™ based operating systems.

Group formation viewer application 202 may be a computer-based application that allows a user, such as user 204, to view one or more group formations 218 on the display screen or device (e.g., output device 110) of computing device 100. In one or more embodiments, user 204 is one of several group members 206 who are active and involved in a group activity, such as group activity 208. Group activity 208 may be any type of group activity that includes organizing and assembling group members 206 into one or more group formations, such as group formations 218. Group activity 208 may relate to any type of group activity associated with music, sports, theater, dance, or other categories of activity. In one non-limiting embodiment, group activity 208, may be a marching band or drill team whereby the group formations 218 in such a case may be one or more formations associated with a marching band and drill formations.

It is noted that group formation viewer 202 is not limited to any high school or college related activity but may be used for any type of group activity regardless of whether the participants are in high school, college, or any other institution.

Group formation viewer 202 may be able to run and implement program code associated with one or more files, such as group formation data file 216. Group formation data file 216 may be created using any type of program code in any file formation known to one of ordinary skill in the art. Group formation data file 216 may include code that allows a user to view one or more formations 218 on the display screen of computing device 100. The term "formation" as used herein may refer to a group of people and/or objects as arranged at a fixed point in time. Group formations may also be described as defined sets of positions and movements for each member of the group at a given point in time for a particular routine.

Figure 22:
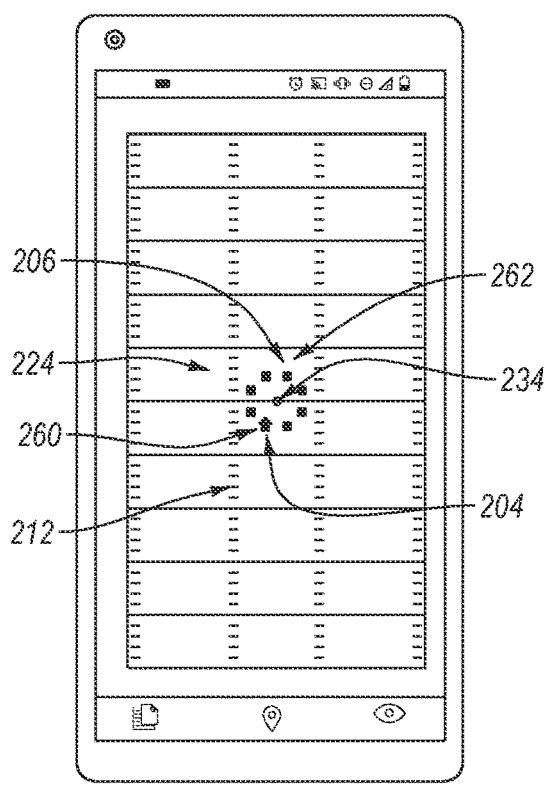
FIG. 22 is a pictorial illustration of a different selected virtual location featuring a football field with a display of one example of a group formation shown in the top-down view in accordance with an illustrative embodiment.
Figure 23:
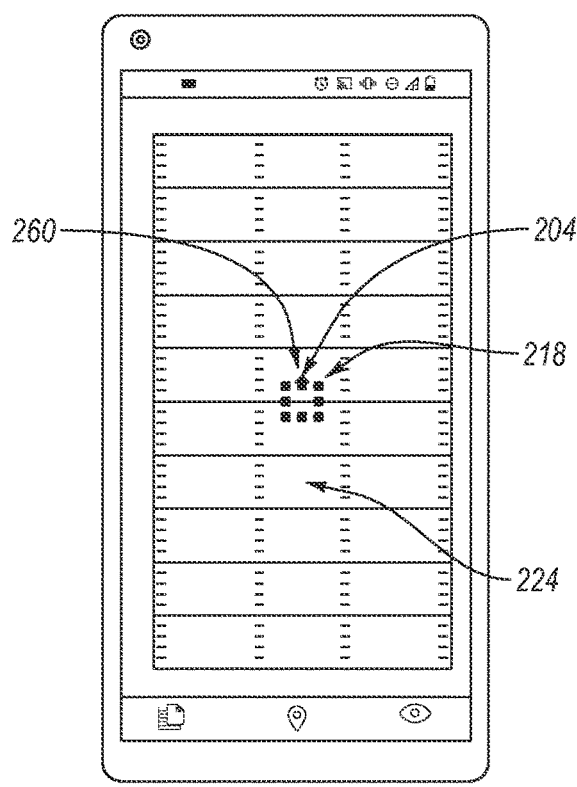
FIG. 23 is a pictorial illustration of another formation displayed in the selected virtual location shown in the top-down view in accordance with an illustrative embodiment.
Figure 24:
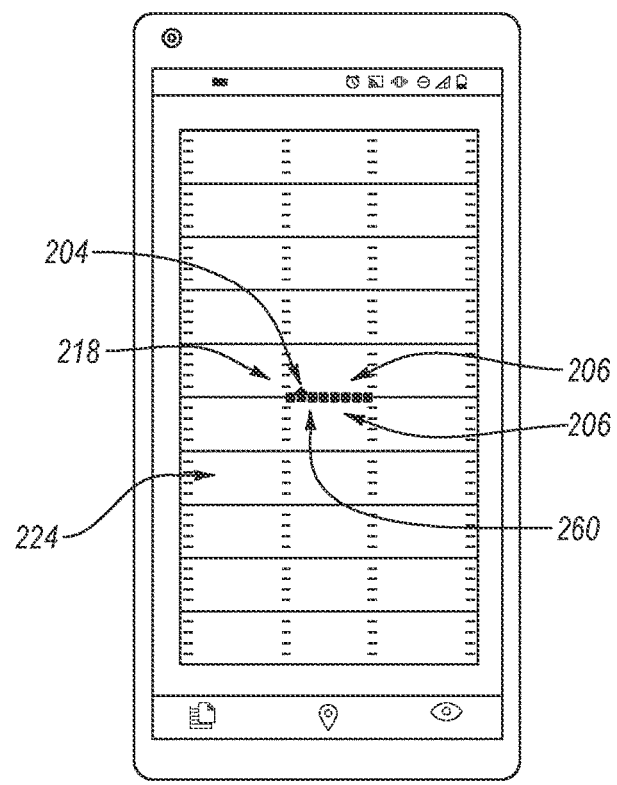
FIG. 24 is a pictorial illustration of an additional formation displayed in the selected virtual location shown in the top-down view in accordance with an illustrative embodiment.

The group formations 218 include specific positions 220 for each group member 206 as well as the user 204 at any fixed point in time. Thus, group formation viewer 202 allows user 204 to determine what position 220 user 204 should be at any given point in time and also allows user 204 to view what position 220 any other group member 206 should be at any given point in time in the course of the formation 218 for the group activity 208. Thus, while position 220 refers to a spot or location of an individual user 204, a group formation 218 reflects where the whole group (i.e., all of the group members 206) are located in time. FIGS. 22-24 show this aspect and feature of the group formation view application 202 clearly as a position 220 of user 204 and other group members 206 are displayed on the display screen of the mobile computing device. Group formation data file 216 may include several various formations 218 or a single formation 218 that user 204 can select in order to practice and train for their group activity 208.

Advantageously, user 204 is enabled to practice and train group formations 218 at any time in any location convenient to user 204. Group formation viewer application 202 is conveniently configured to be accessible on any computing device 100, including the user's mobile computing devices 100, meaning the user 204 is not limited to practice his or her group activity 208 only when all of the group members 206 are available. User 204 may practice and train on mastering his or her skill and artistry performing or otherwise engaging in the formations 218 associated with his or her group activity 208 and may do so while training with or without any group members 206.

Director 280 is shown in FIG. 2. The director 280 may be an individual who is responsible for or is a manager of the group activity 208. In one or more non-limiting embodiments, the director 280 may be enabled to create the original group formation data files 216. Further, any updates or changes to a group formation data file 216 may be made by the director 280 and shared with the group formation viewer application 202 so that the user 204 has the correct version of the group formation data file 216 to use when practicing the group activity 208 and group formation 218. In one or more non-limiting embodiments, either the user 204 re-downloads the updated group formation data file 216 for viewing and use on his or her group formation viewer application 202 and mobile computing device 100 or the existing group formation data file 216 may automatically update with any changes and the user 204 does not have to re-download the data file 216.

Top Down View

A unique feature of group formation viewer 202 is that group formation viewer 202 enables user 204 to select at least two types of views to display one or more formations 218. These views include, without limitation, the top-down view 212 and the augmented reality view 214, as shown in the block diagram in FIG. 2. In the top-down view 212, group formations 218 (which are visually displayed as visual objects and are extracted data from the group formation data file 216) are displayed from a bird's eye or top view with each group member 206, including user 204, displayed as a two-dimensional graphical symbols 226. Accordingly, in the top-down view 212, each position 220 associated with any of the participants 206 is displayed as a two-dimensional graphical symbol (e.g., as shown in FIGS. 21-24). Thus, in top-down view 212, the overall formation 218 is visible as a whole group on the display screen 110 of computing device 100.

In one or more non-limiting embodiments, reference point 234 is a point or marker that the user selects while in the top-down view 212. The reference point 234 that is part of the top-down view display 212 may refer to a particular area or region of the virtual practice location 224 that the formation 218 is displayed as being located. For example, in FIG. 22, the reference point 234 is displayed as being in the center of the virtual football field. Thus, the formations 218 displayed in FIG. 22 are shown as being located in the center of the virtual football field. In other non-limiting embodiments, the user 204 may change the reference point 234 as desired and locate the formations 218 anywhere on the virtual image of the virtual practice location 224, including, the top or bottom corners of the display screen of the computing device 100. Selecting a reference point 234 may be a step used to calibrate the group formation viewer application 202 when the user 204 initiates and selects using the top-down view 212. In other non-limiting embodiments, the reference point 234 is automatically included and positioned automatically at a particular location on a display screen of the computing device and within the group formation viewer application 202 when the user 204 initiates the top-down view 212.

As further discussed with respect to FIGS. 20-24, in the top-down view 212, user 204 is able to select a virtual practice location, such as virtual practice location 224. In the virtual practice location 224, the two-dimensional graphical symbols 260 of each group member 206, including user 204 is displayed on the display screen of the computing device 100. In one or more non-limiting embodiment, the user 204 selects the desired virtual practice location 224 from any of the available pre-determined virtual practice locations. In one or more non-limiting embodiments, virtual practice locations 224 includes a virtual football field and basketball court. As shown in FIGS. 20-24, an example football field acts as a virtual practice location 224 and may include the yard line numbers and distribution displayed on the display screen 110 of the computing device 100 according to how an actual, real world football field may appear. Accordingly, if the group activity 208 is to be performed or otherwise implemented in a football field, it is helpful for user 204 to view one or more formations 218 and his or her positions 220 in each formation 218 as shown in the virtual football field. As noted above, top-down view 212 may be implemented in any virtual practice location 224 and is not limited to the virtual football field or virtual basketball court illustrated in FIGS. 20-24. Additional or alternative virtual practice locations 224 may include a theater or rehearsal hall, a classroom, a stadium, parking lot, a field, or any other type of virtual practice location.

The top-down view 212 may include computer-generated graphical symbols 260 that indicate the positions 220 of both the user 204 and the other group members 206 in the virtual practice location 224. The top-down view 212, as noted above, presents the group members 206 and the user 204 as a whole group arranged in the selected formation 218 (e.g., as shown in FIGS. 21-24).

The graphical symbols 226 may further include a positional graphical indicator 260 that shows the position 220 of user 204 in the selected formation 218. The positional graphical indicator 260 (e.g., as shown in FIGS. 21-24) may be a highlighted arrow or other highlighted graphical symbol 226 that shows where user 204 should stand or move to.

Graphical symbols 226 in the top-down view 212 may further include two-dimensional (2D) models 262. 2D models 262 may illustrate and indicate where the other group members 206 are located in a selected formation 218 as shown in the top-down view 212. The 2D models 262 in FIGS. 21-24 are shown as being two-dimensional square shapes. However, it is noted that these 2D models 262 as shown in FIGS. 21-24 are exemplary only and not limited to the illustrated squares. In other embodiments, any type of shape, color, or other graphical symbol may be associated with the 2D models 262 (e.g., as shown in FIG. 22) in the top-down view 212. These graphical symbols 226 allow user 204 to view using group formation application viewer 202 their respective positions 220 in each formation 218 from a bird's eye view or top-down view 212 to better understand the location of every member 206 of the group. Further, top-down view 212 can show the changes and transitions to different formations 220 (e.g., as shown with the different formations 218 in FIGS. 21-24).

Augmented Reality View

Another type of view available to user 204 using group application formation viewer 202 is the augmented reality view 214. The augmented reality view 214 combines computer generated, digitally created images that are superimposed over a real-world user observed viewpoint 230 as captured by the camera 120 of computing device 100 and as displayed on user's display screen or device 110 of the user's computing device 100. The user observed viewpoint 230 comprises a first-person realistic view of one's surroundings. Augmented reality view 214 includes positional graphical indicators 238 and other graphical symbols or images that direct and guide user 204 to his or her position 220 in a formation 218. Further, augmented reality view 214 includes 3D models 242 that simulate the locations of other group members 206 involved in the same group activity 208 as user 204 in one or more formations 218 and are also superimposed over the real-world images displayed on the display screen 110 of the user's computing device 100.

Figure 4:
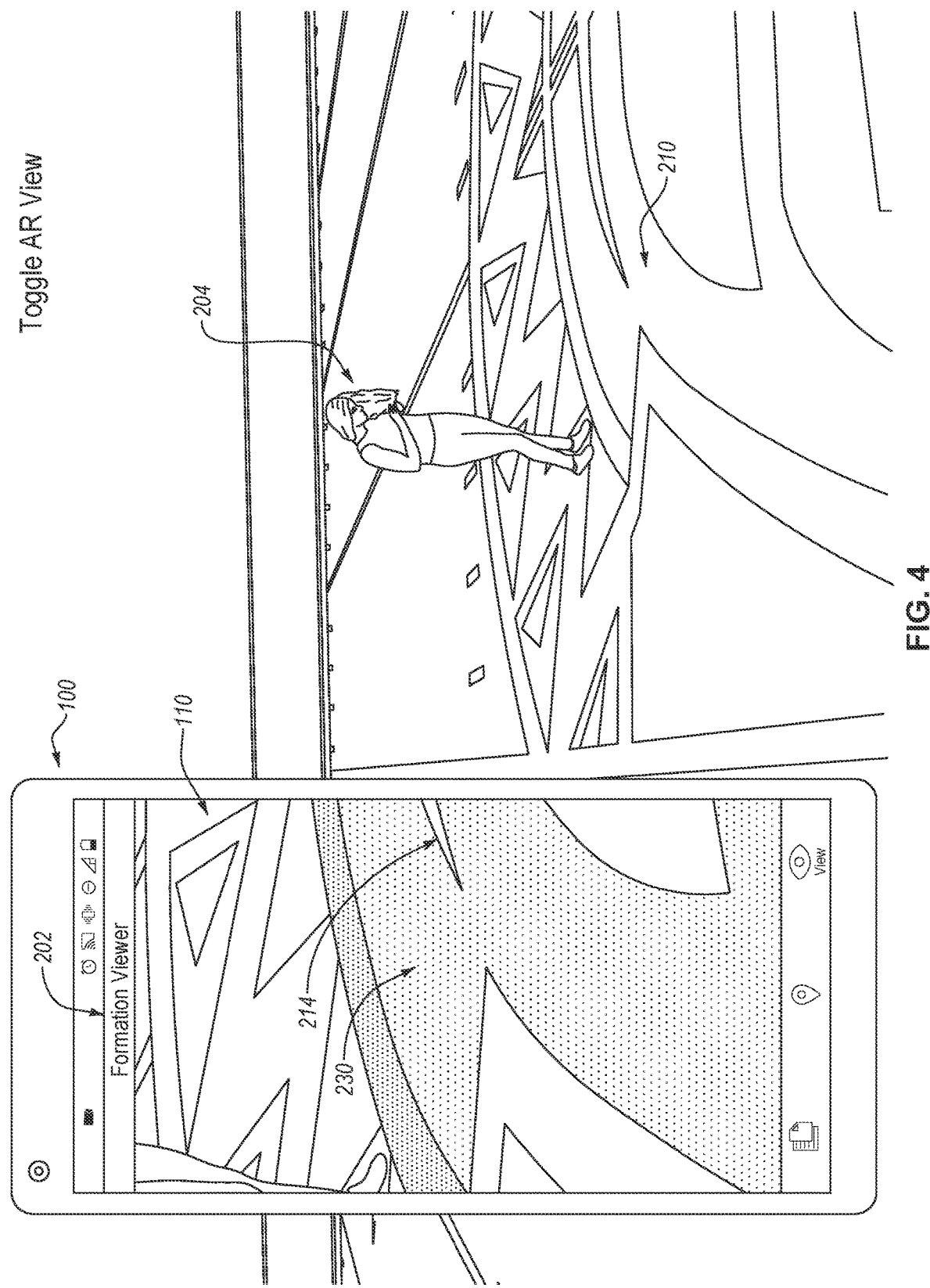
FIG. 4 is a pictorial illustration of an example display screen showing a user observed viewpoint on a computing device in a real user environment in accordance with an illustrative embodiment.

When the augmented reality view 214 is selected by the user 204, the cameras 120 of computing device 100 reflect the actual surrounding environment that the user is in, otherwise referred to in FIG. 2 as real user environment 210 (e.g., as shown in FIG. 4 and throughout the FIGS. 5-19). Real user environment 210 may be any outdoor or indoor location of interest to user 204. Accordingly, if user 204 is located in his or her backyard, when the augmented reality view 214 is selected, the display device 110 of computing device 100 will reflect the backyard of the user 204. The same is true of any real-world physical environment in which user 204 is located. In FIGS. 4-19, the user 204 is displayed in the example pictorial illustrations as being located in an actual outdoor football field, in which case the actual outdoor football field is the real user environment 210. In many cases, real user environment 210 may be the actual physical location that the group activity 208 will be performed or executed at the time of actual performance. Thus, if user 204 will be performing one or more formations 218 of group activity 208 in an actual outdoor football field (e.g., as shown in FIGS. 4-19) it may be helpful for user 204 to practice and train at any convenient time for user 204 in the outdoor football field using the augmented reality view 214 and the group formation viewer application 202.

Figure 6:
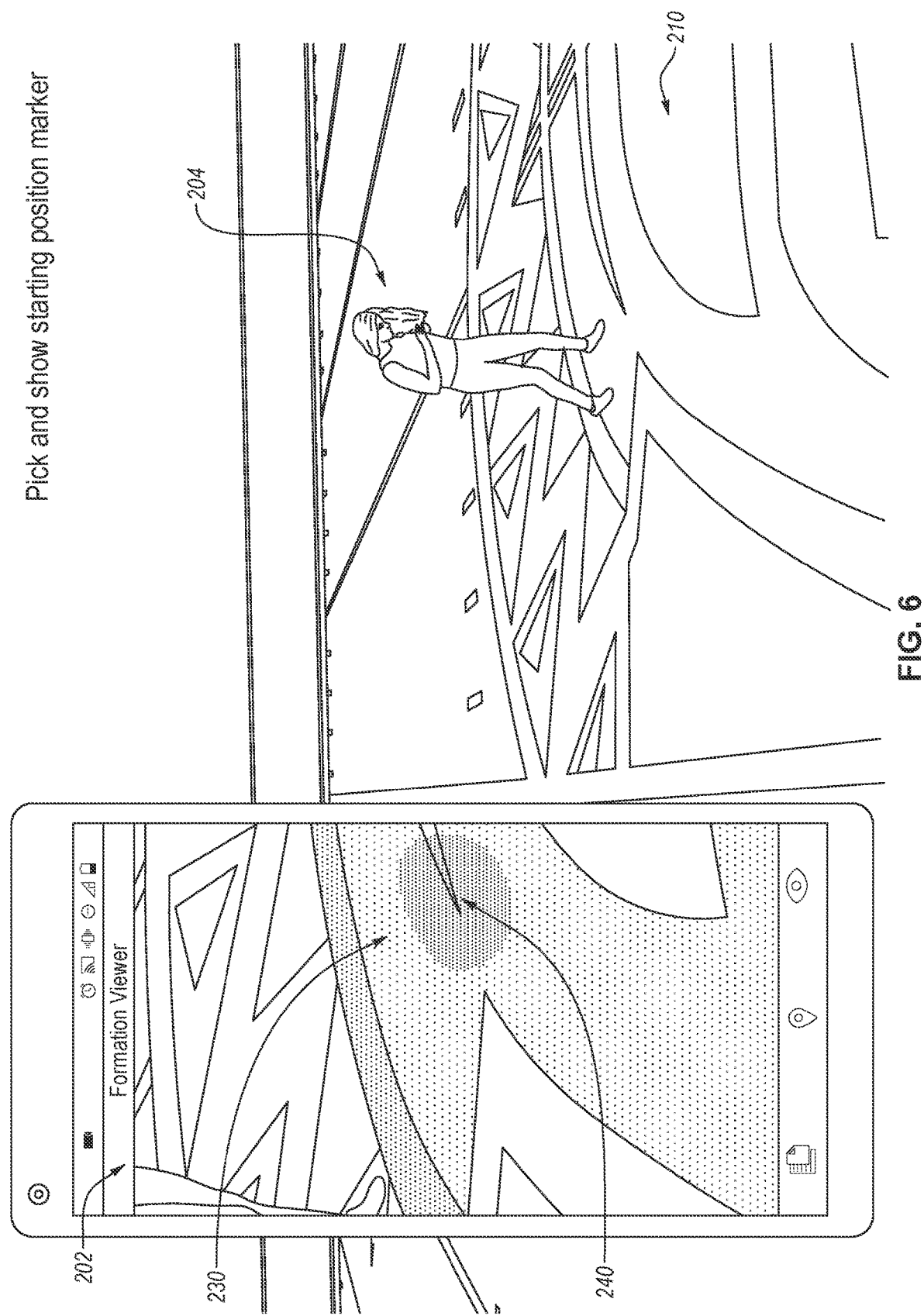
FIG. 6 is a pictorial illustration of an example display screen for selecting an augmented reality view and detecting a ground surface in the selected augmented reality view in accordance with an illustrative embodiment.
Figure 8:
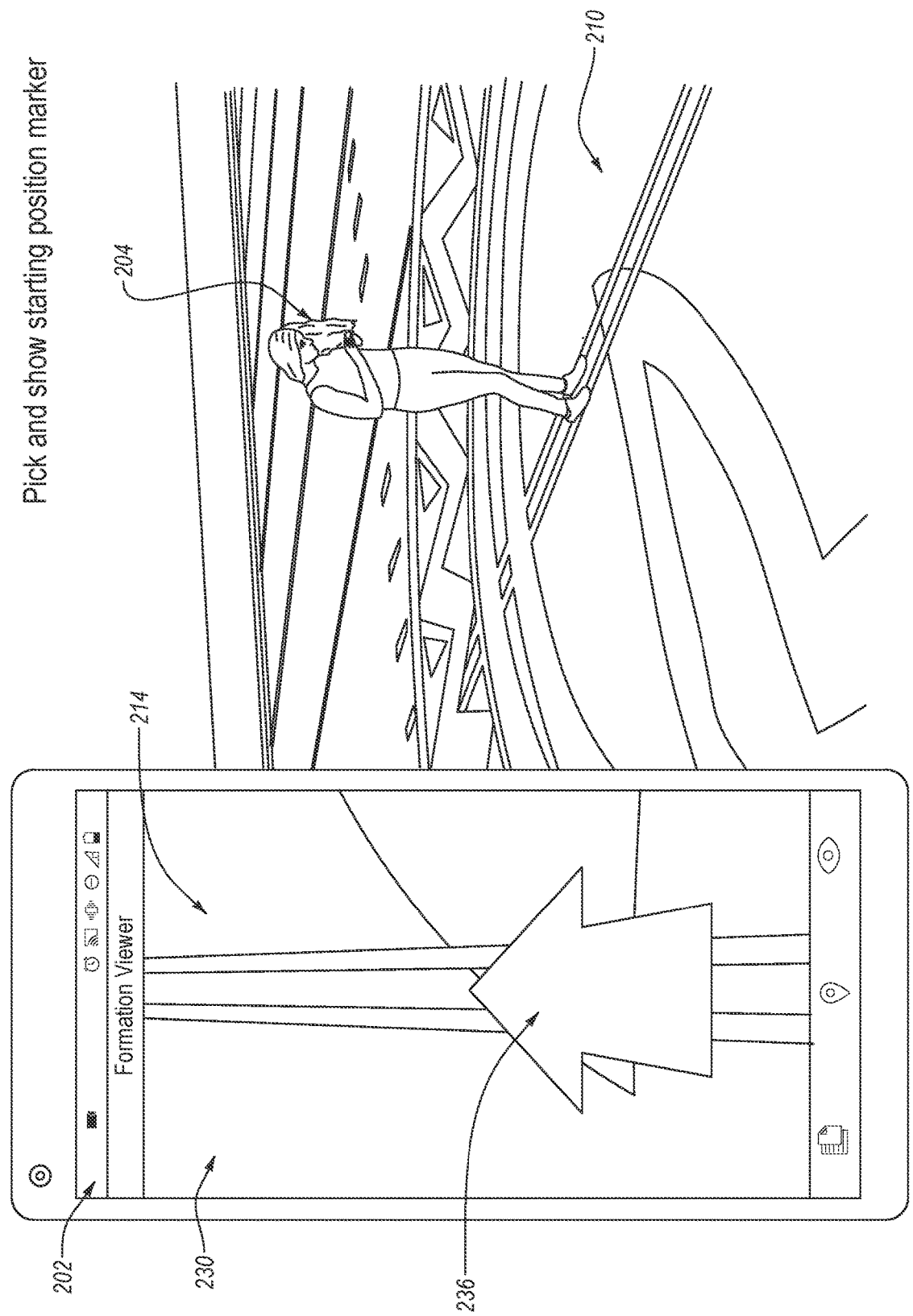
FIG. 8 is a pictorial illustration of an example display screen of a starting position marker displayed in the group formation computer-based application in accordance with an illustrative embodiment.
Figure 9:
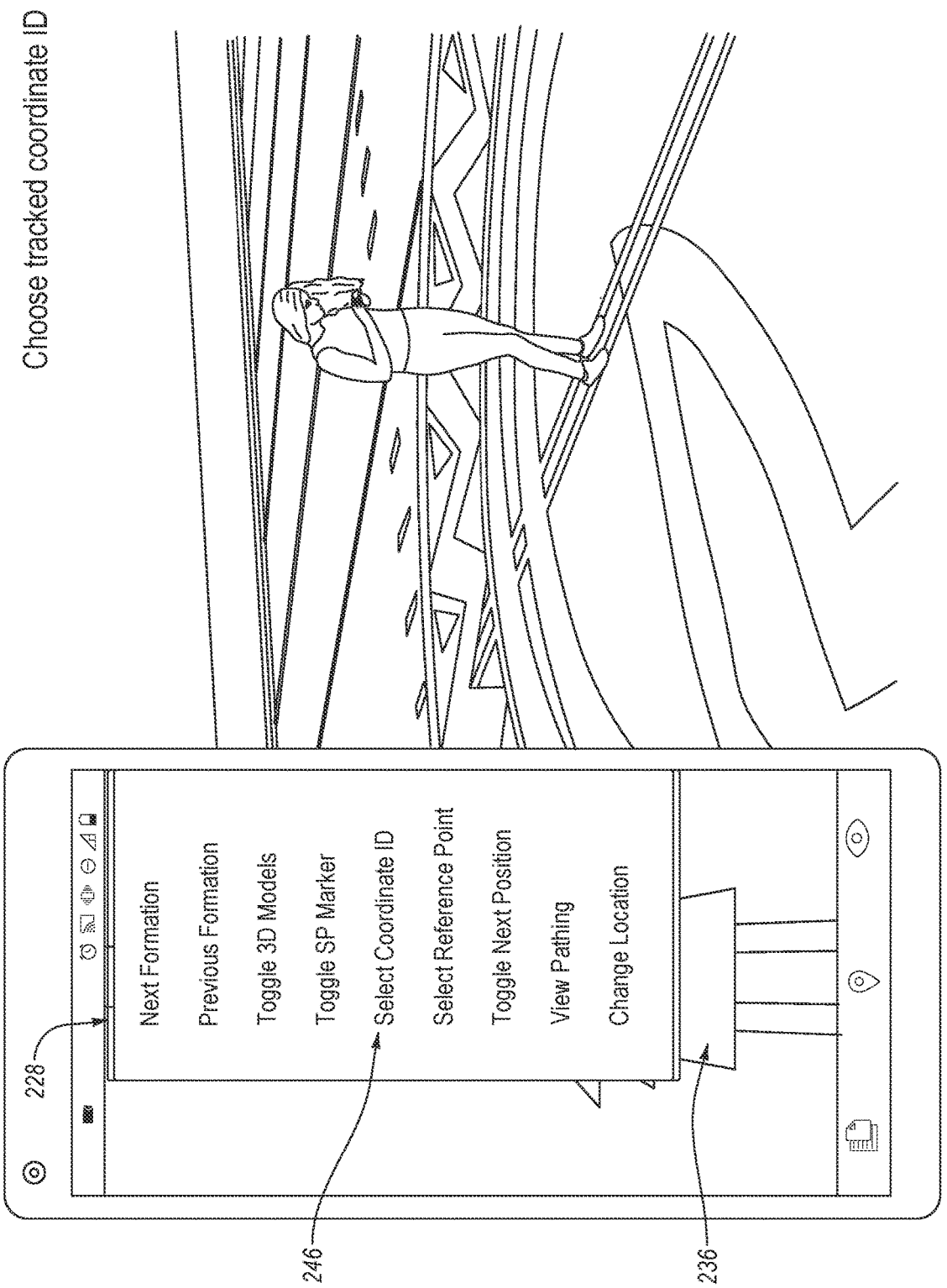
FIG. 9 is a pictorial illustration of an example display screen for selecting a tracked coordinate ID corresponding with the positions of a user in a group formation in accordance with an illustrative embodiment.
Figure 15:
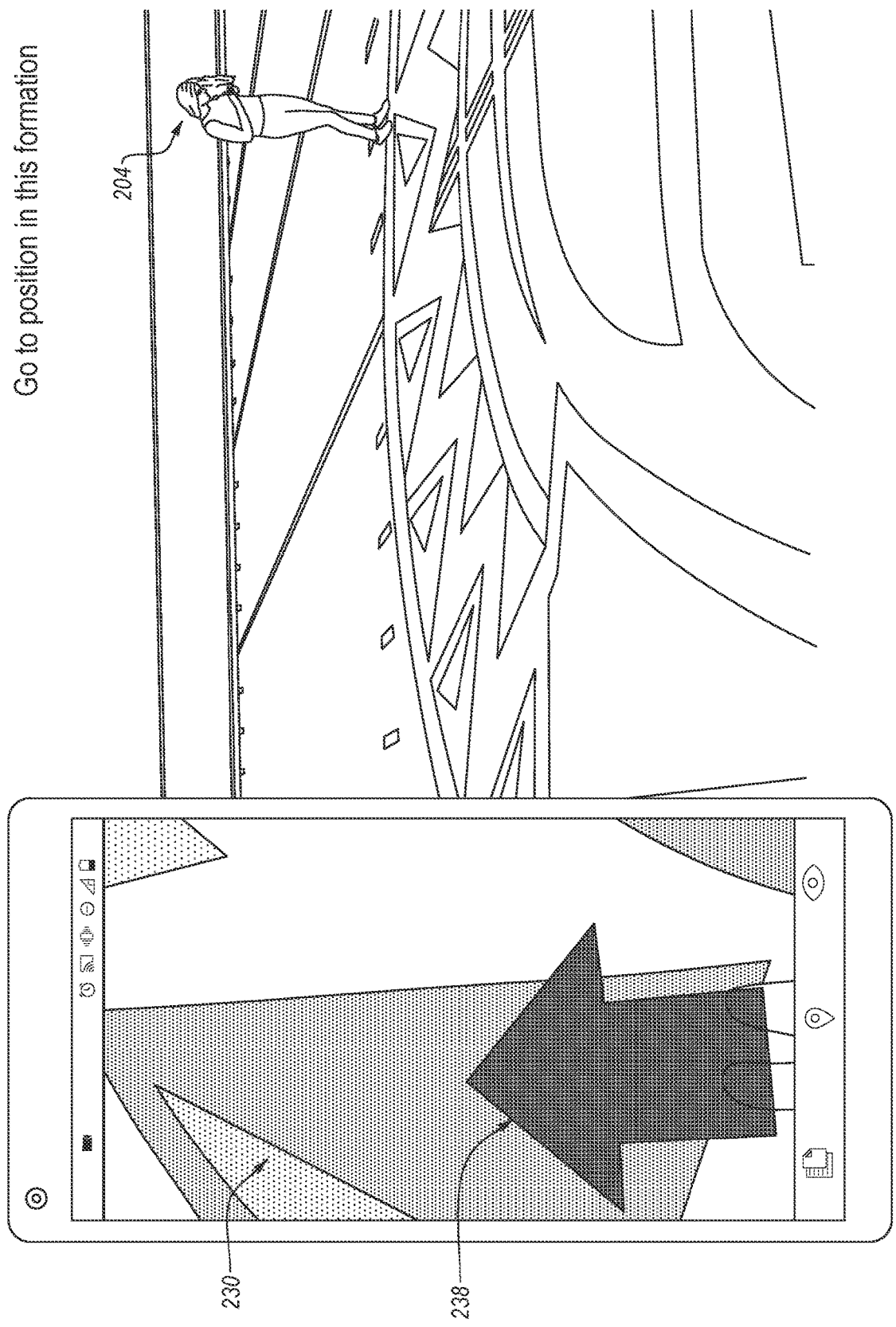
FIG. 15 is a pictorial illustration of an example display screen for a positional graphical indicator connected to the user's position and tracked coordinate ID in accordance with an illustrative embodiment.
Figure 16:
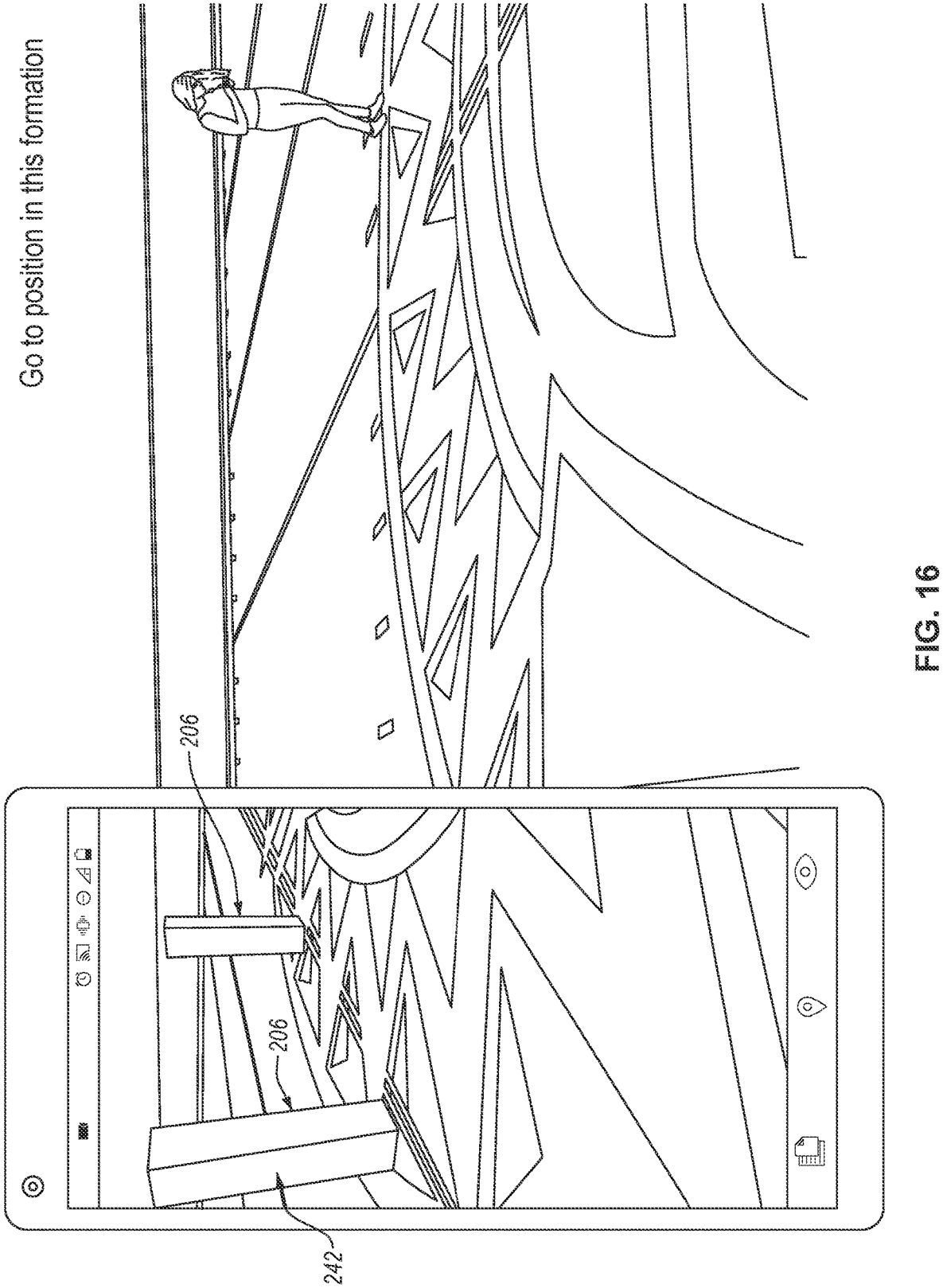
FIG. 16 is a pictorial illustration of an example display screen for displaying 3D (three-dimensional) models of other group members from a group formation in the augmented reality view in accordance with an illustrative embodiment.
Figure 17:
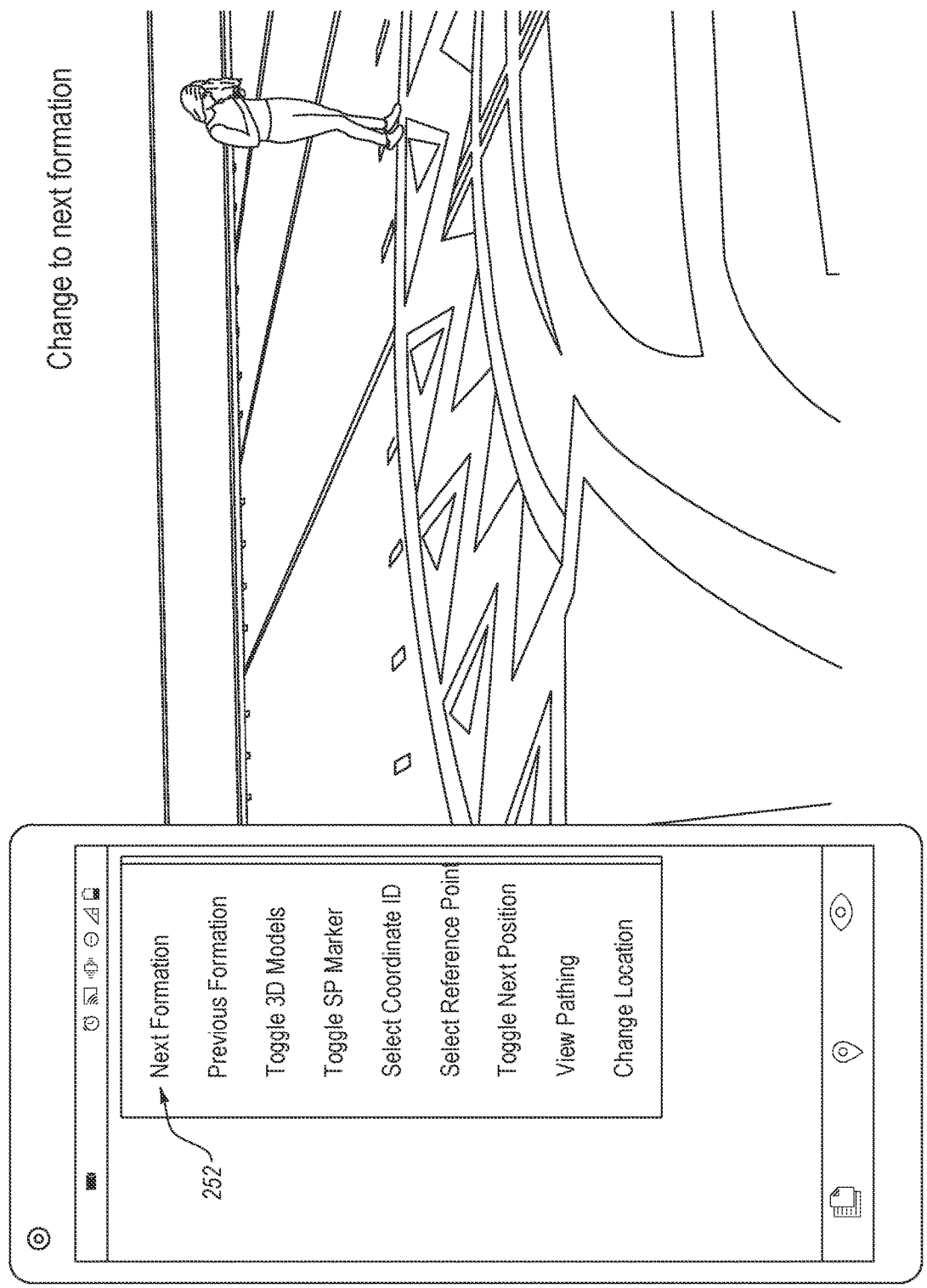
FIG. 17 is a pictorial illustration of an example display screen for changing to a different formation using a menu in the group formation computer-based application in the augmented reality view in accordance with an illustrative embodiment.
Figure 18:
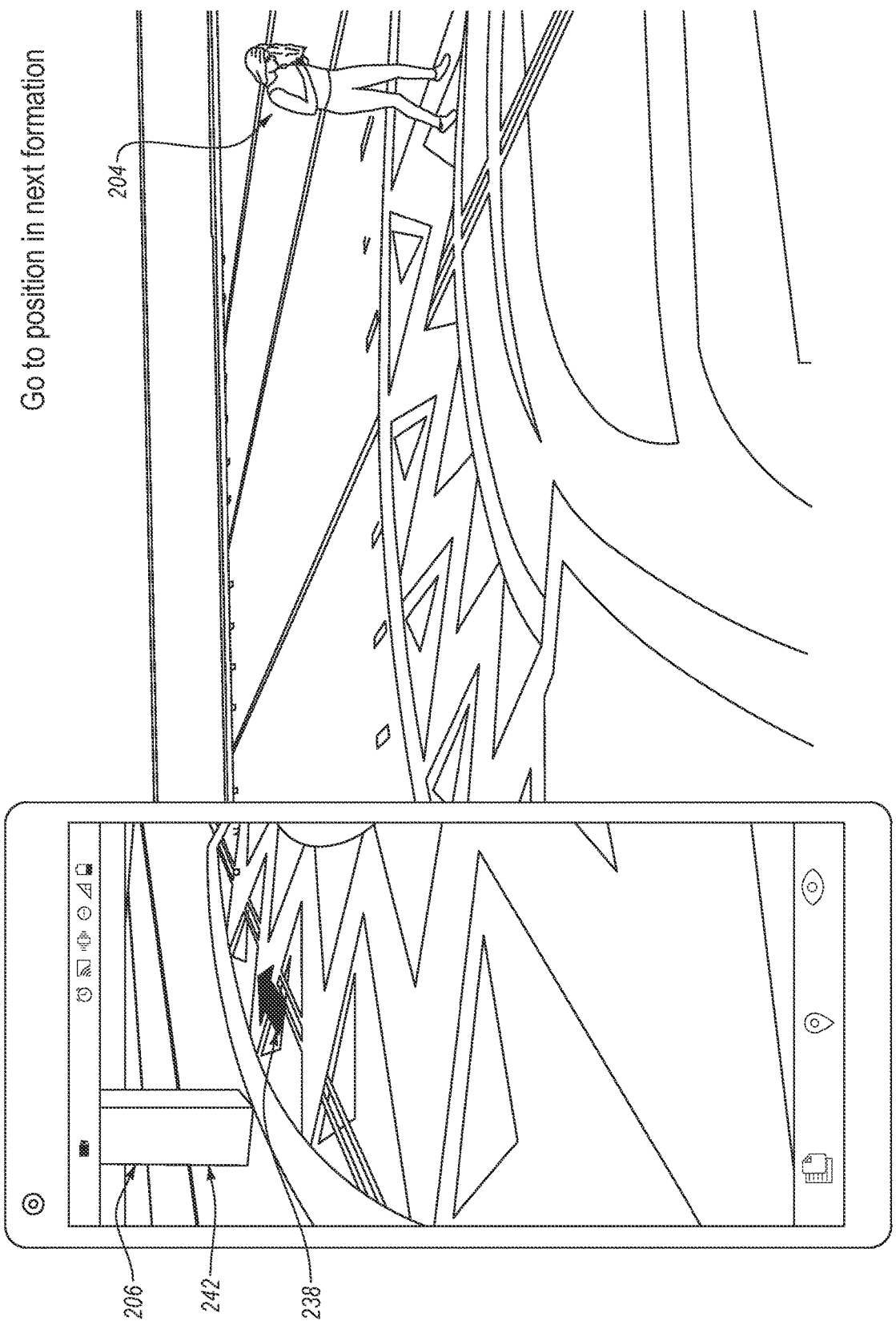
FIG. 18 is a pictorial illustration of an example display screen for displaying a position of the user in the different formation in the augmented reality view in accordance with an illustrative embodiment.
Figure 19:
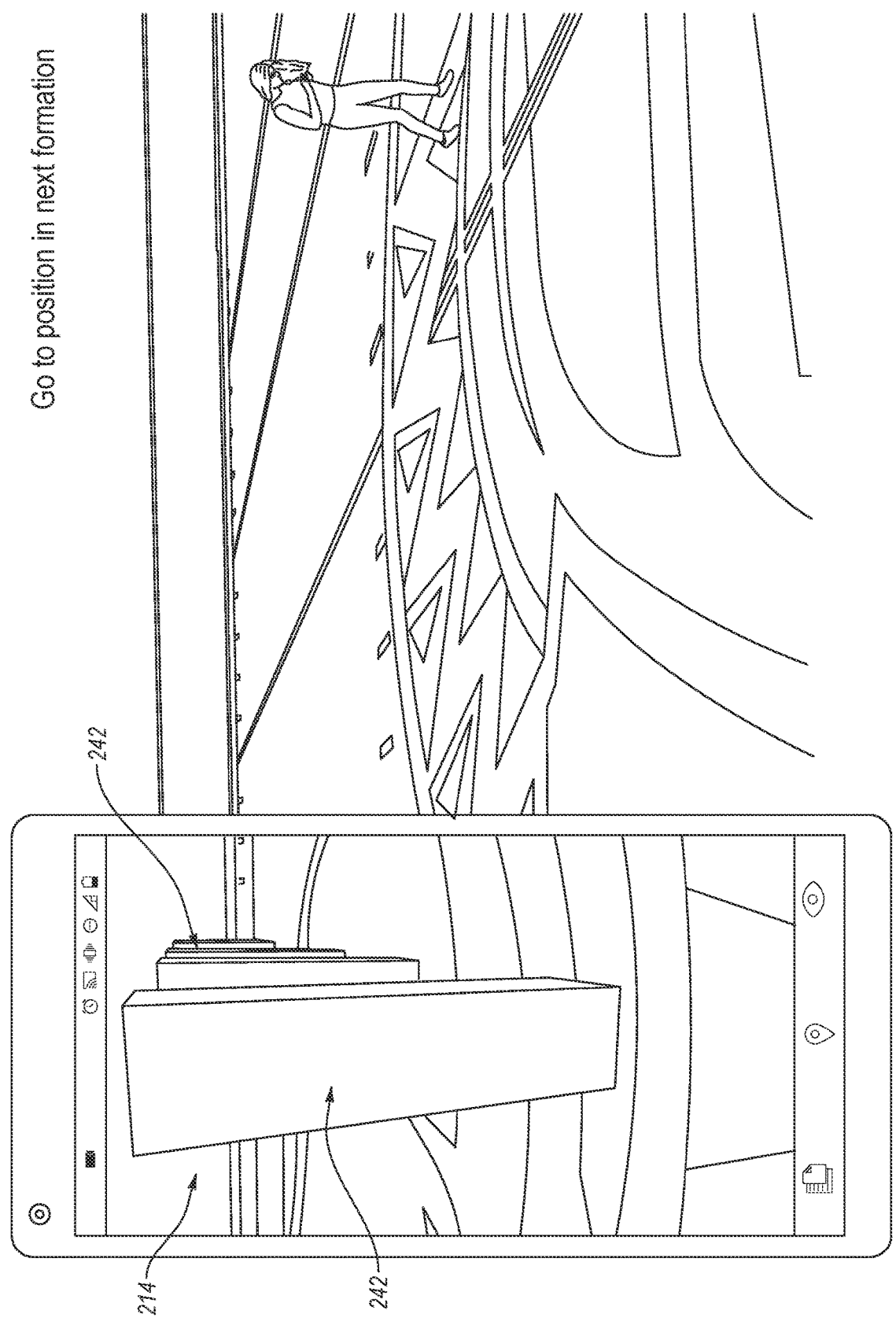
FIG. 19 is a pictorial illustration for displaying 3D models representing the other group members in the group formation in the different formation in the augmented reality view in accordance with an illustration embodiment.

Thus, augmented reality view 214 presents the user observed viewpoint 230 with superimposed computer-generated images. Such superimposed computer-generated images may include, but are not limited to, starting position marker 236 (e.g., as shown in FIGS. 8-9), positional graphical indicators 238 (e.g., as shown in FIG. 13 and FIG. 15), ground surface detection grid 240 (e.g., as shown in FIG. 6), and 3D models 242 (e.g., as shown in FIG. 16 and FIGS. 18-19) in one or more embodiments.

Starting position marker 236 is a graphical indicator used to indicate a starting position of user 204 in the real user environment 210 when the user 204 has selected the augmented reality view 214. A positional graphical indicator 238 is also a graphical indicator used to indicate a position of the user 204, but not necessarily the starting position which is uniquely identified by the starting position marker 236. A positional graphical indicator 238 may be used to indicate each position in each selected formation and tells the user 204 where to move to in his or her real user environment 210.

A positional graphical indicator 238 may be similar in nature and in appearance to a starting position marker 236 in one or more non-limiting embodiments. For example, both the starting position marker 236 and the positional graphical indicators 238 may both be arrows as shown in FIGS. 8-9 and FIGS. 13 and 15. However, in other embodiments, the starting position marker 236 may have another appearance or symbol that is different than the symbols and appearance of the graphical images used to indicate the location of the positional graphical indicators 238.

In one or more non-limiting embodiments, a ground surface detection grid 240 may appear on the display device screen 110 of the computing device 100 when the augmented reality view 214 is first selected. The ground surface detection grid 240 may be used by the group formation viewer computer application 202 to detect a ground surface so as to calibrate and orient the group formation viewer application 202 to the real user environment 210.

In addition to the above computer-generated images, in one or more non-limiting embodiments, group formation viewer application 202 may further include 3D models 242. 3D models 242 are computer-generated images that appear to have a three-dimensional structure or appearance and serve as indicators of the positions 220 of other group member 206. FIGS. 16, 18, and 19 show examples of 3D models 242 that may be used in augmented reality view 214. The 3D models 242 represent other group members 206 and their respective positions 220 in each selected formation 218 from the one or more formations 218 stored in the group formation data file 216. The use of the 3D models 242 superimposed over the user observed viewpoint 230 when using the augmented reality view 214 to practice and train their group activity 208 may allow user 204 to better understand the movements of the group as a whole. In particular, the incorporation of the 3D models 242 in the augmented reality view 214 allows the user 204 to be sensitive to and better comprehend the positions and movements of the group members 206, including those nearest to the position 220 of the user 204.

In one non-limiting example, 3D models 242 in FIGS. 16, 18, and 19 are illustrated as being 3D pillars. Any other type of symbol or graphical image may be used to represent 3D models 242 without limitation to those shown in these figures. As noted above, the positional graphical indicators 238, shown in FIG. 13 and FIG. 15, may be used to visually indicate a position 220 of the user 204 while the 3D models 242 (shown in FIGS. 16, 18, and 19) may be used to represent the positions 220 of the other group members 206 for each selected formation 218 in the augmented reality view 214.

Figure 10:
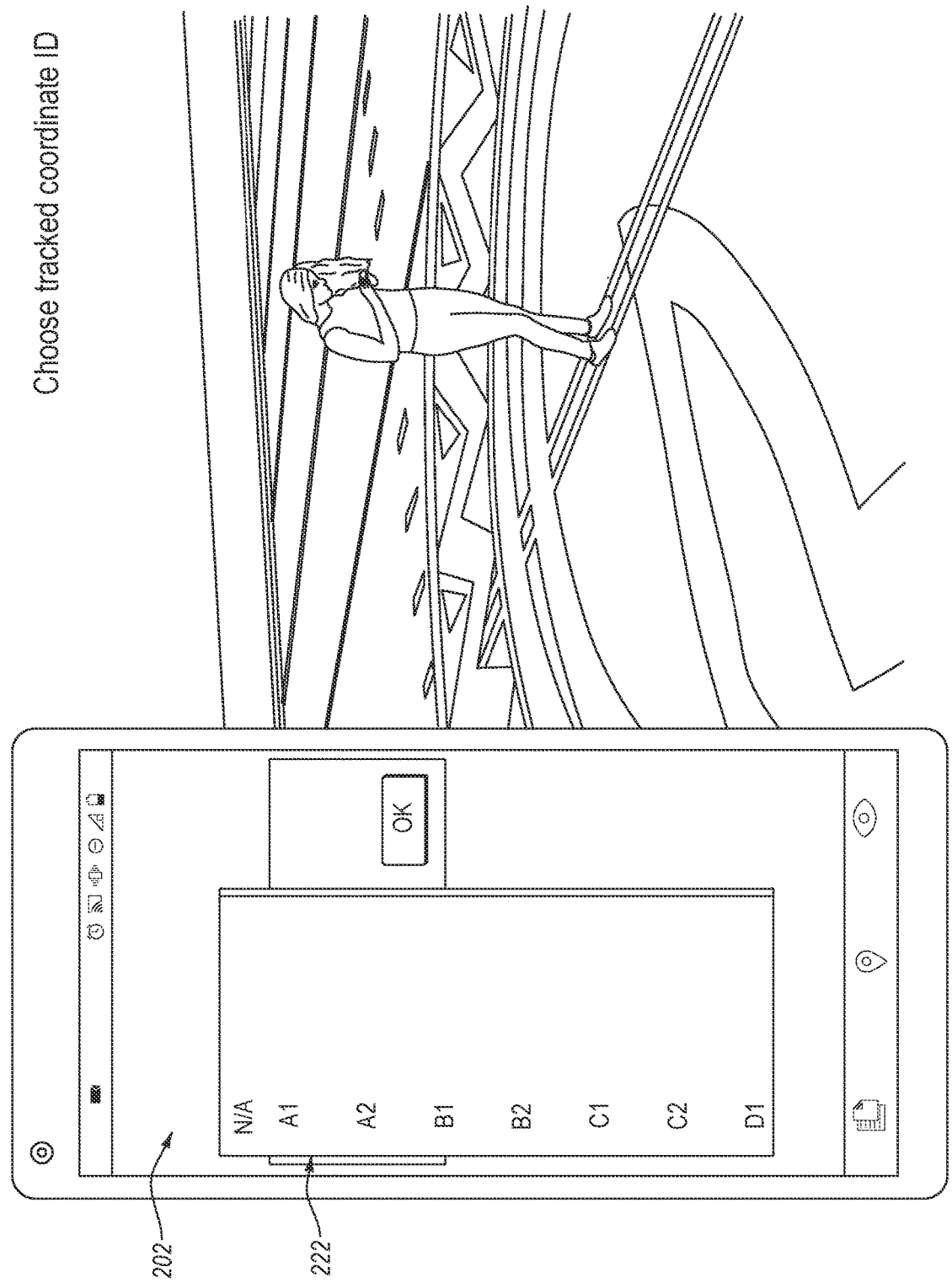
FIG. 10 is a pictorial illustration of an example display screen for selecting a coordinate ID in accordance with an illustrative embodiment.
Figure 11:
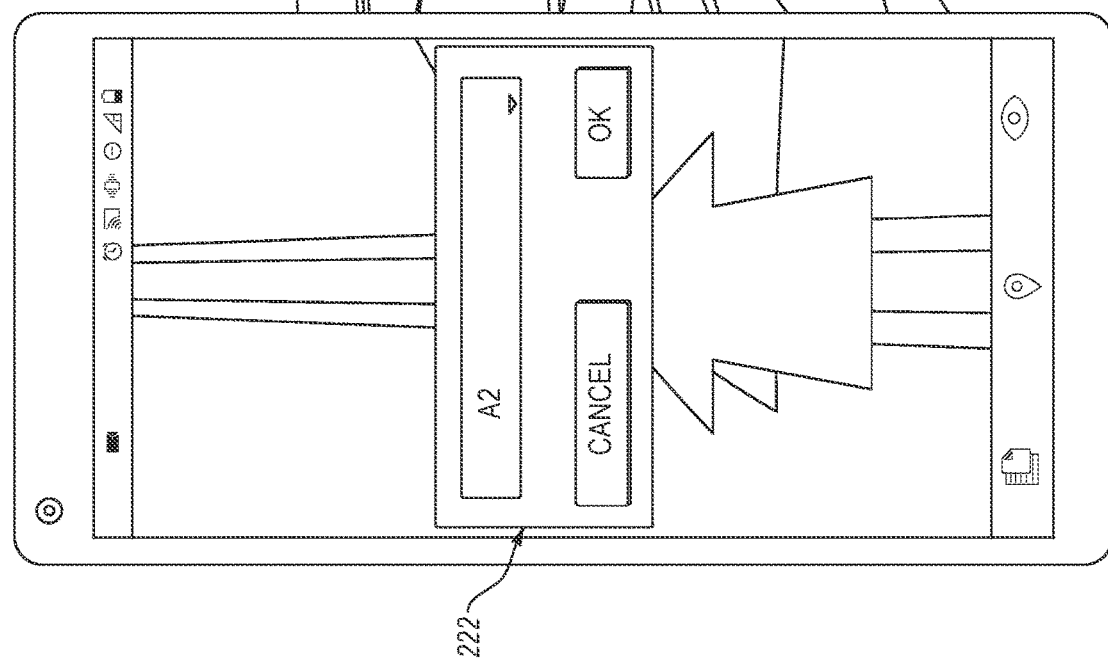
FIG. 11 is a pictorial illustration of an example display screen for selecting a coordinate ID in accordance with an illustrative embodiment.

Group formation viewer application 202 may include a coordinate identification (ID) 222 which corresponds to each user 204 and to each group member 206. Accordingly, a coordinate ID 222 (e.g., as shown in FIGS. 10 and 11) that is assigned to each of the group members 206. The coordinate ID 222 is tracked throughout the selected formation 218 and may be selected for either the top-down view 212 or the augmented reality view 214. In one or more non-limiting embodiments, a specific coordinate ID 222 matches the user 204 and each position for the user as specified in the selected formation 218 from the group formation data file 216. Indeed, each group member 206 may have an assigned coordinate ID 222 in the selected formation 218. In a non-limiting embodiment, the director 280 or other member (e.g., from administrative entity 128 shown in FIG. 1) assigns a coordinate ID 222 for each user 204 and group member 206 in the group formation data file 216. Accordingly, a unique coordinate ID 222 is assigned to each group member 206 in the formation 218 and corresponds to each position 220 of each group member 206 in the formation 218. Further, the coordinate ID 222 connects with the routine or path of each group member 206 in the formation 218. Accordingly, user 204 may select his or her coordinate ID 222 so that the routine and path associated with the user 204 is the primary routine or path that is displayed on the display screen 110 of the computing device 100 (as opposed to another group member's 206 routine or path).

In one or more non-limiting embodiments, a user 204 may select coordinate ID 222 using a menu, such as menu 228. In alternative embodiments, the coordinate ID 222 may be automatically configured to associate with user 204 when user 204 opens the group formation viewer application 202.

Menu 228 may be a drop-down menu screen of the kind known to those of ordinary skill in the art that includes one or more selectable commands or instructions for the group formation viewer application 202. Such selectable commands or instructions (e.g., reference numbers 282-258 in FIG. 2) may be associated with components and actions in group formation viewer application 202 that have particular effects on the top-down view 212 and augmented reality view 214 as it appears to user 204. Such commands available from menu 228 (or another alternative user interface) may include, without limitation thereto, "Select Reference point 282," "Toggle Starting Position 244," "Select Coordinate ID 246," "Toggle 3D Models 248," "View Pathing 250," "Next Formation 252," "Previous Formation 254," "Toggle Next Position 256," and "Change Location 258." The wording and text may vary for any of these or other commands included in the menu 228 as well as the order of display on the menu screen 228. As used herein, the term "toggle" may mean "select" or "unselect" so that a user may toggle a feature to display on and off of the display screen 110 of the computing device 100.

In one or more non-limiting embodiments, "Select Reference Point 282" may allow a user to select a reference point 234, as described above, for the virtual practice location 224 in order to calibrate the application 202 in top-down view 212. "Select Starting Position Marker 244" may allow user 204 to select where to place a starting position marker 236 on the display screen 110 of the computing device 100. "Select Coordinate ID 246" may allow a user to select a coordinate ID 222. "Toggle 3D Models 248" may allow the user to toggle on and off the 3D models 242 that may appear in the augmented reality view 214 to represent the positions 220 of other group members 206 in the formations 218.

Figure 7:
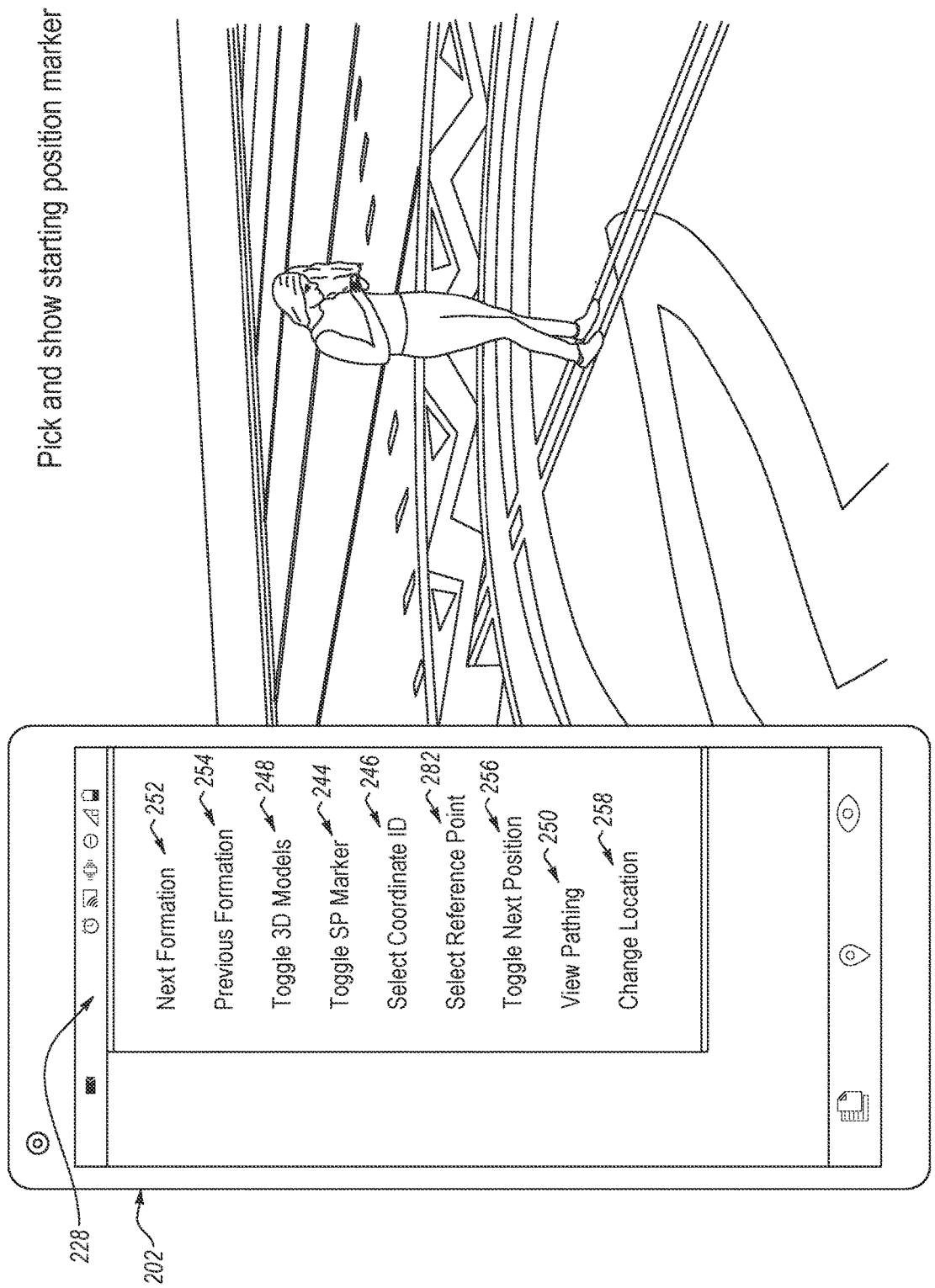
FIG. 7 is a pictorial illustration of an example display screen of a menu with various commands for selection by a user in accordance with an illustrative embodiment.
Figure 14:
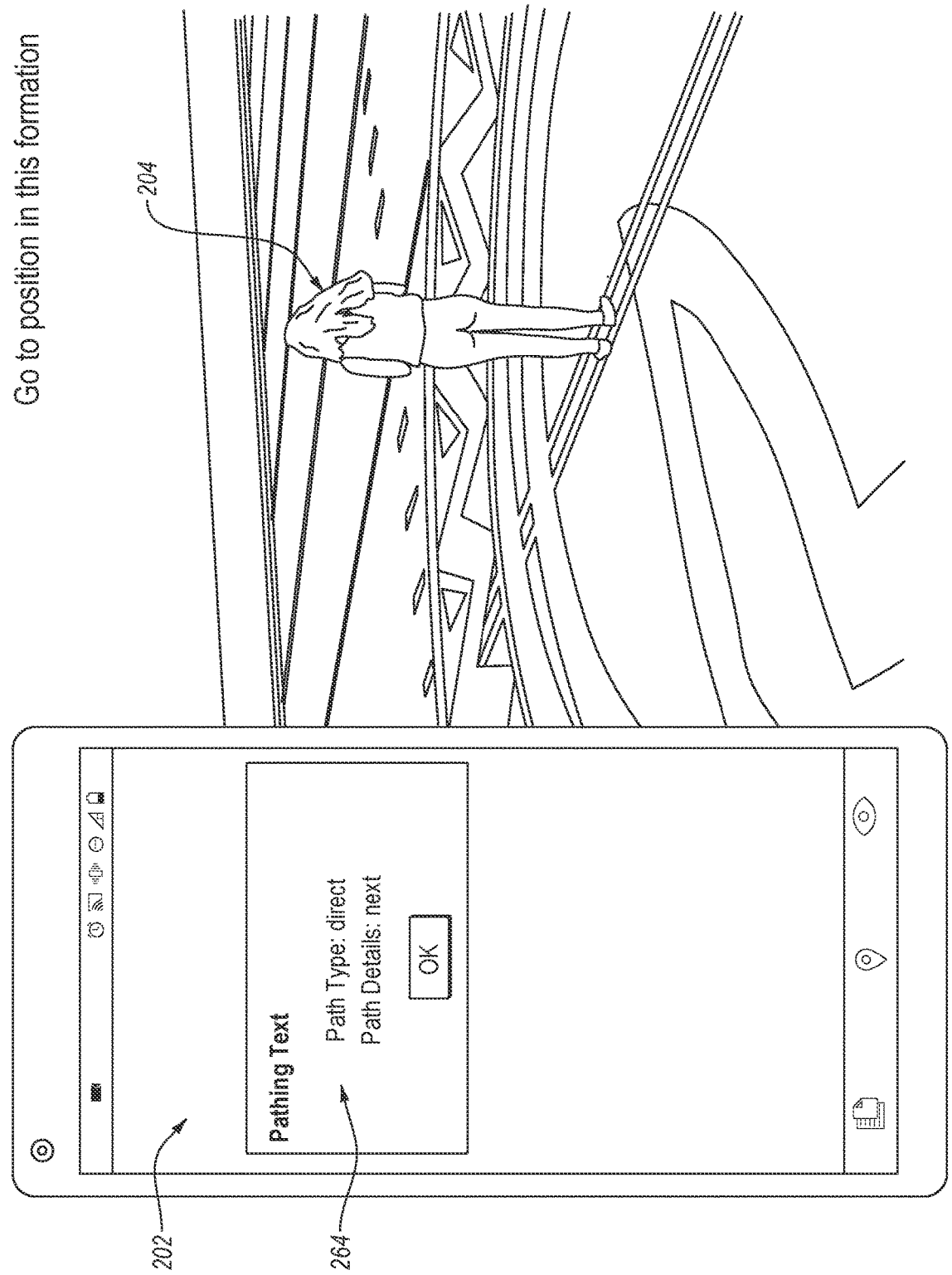
FIG. 14 is a pictorial illustration of an example display screen for a path information dialogue box in accordance with an illustrative embodiment.

In one or more non-limiting embodiment, user 204 may be provided with written directions regarding where and how to proceed to each position 220 in a selected formation 218. Path information 264 may include these written directions or information about where and how to proceed to each position 220 in each formation 218. FIG. 14 provides an example of pathing information 264 that may be displayed to user 204 on the display screen 110 of the computing device 100. The pathing information 264 may appear, in one or more non-limiting embodiments, as a text box that appears with the pathing information 264. In other embodiments, the pathing information 264 may be superimposed over one or more positional graphical indicators 238 in the augmented reality view 214 or in any other part of the augmented reality view 214. To view the pathing information 264 at any time between one position 220 to the next position 220, user 204 may select to see the pathing information 264 by selecting the "View pathing 250" instruction in the menu 228 of the group formation viewer application 202 (e.g., as shown in FIG. 2 and FIG. 7). Pathing information 264 may provide written or other types of information indicating how a user 204 should move to the next position 220 in a formation 218. This may include information related to how fast or slow to move or to use a particular type of technique or movement unique to the group activity 208 to transition to the position 220.

Continuing with the commands available in menu 228, in one or more non-limiting embodiments, menu 228 may include an instruction for user 204 to display the next formation 218 from the set of formations 218 in the group formation data file 216, whereby user 204 may select "Next formation 252" from the instructions in the menu 228. Additionally, user 204 may select "Previous Formation 254" to view a previous formation 218 from the set of formations 218 in the group formation data file 216 as shown in FIG. 7. Accordingly, user 204 may alternate between the formations 218 as displayed on their display screen 110 of their computing device 100.

To show the change from one position 220 to a following position 220 in a particular formation 218, the user 204 may select "Toggle next position 256" from the menu screen 228. Selecting "Next Formation 252" or "Previous Formation 254" may change the entire formation 218 displayed in the top-down view 212 or the augmented reality view 214, which is different from selecting to change from one position 220 to another 220 in the same formation 218.

If the user 204 desires to change a virtual practice location 224 from one virtual practice location to another, he or she may select the "Change location 258" command available in the menu screen 228 of the group formation viewer application 202. For example, as shown in FIGS. 21-24, user 204 may choose to display a formation 218 in the virtual basketball court or to display a formation 218 in the virtual football field, whereby the virtual basketball court and the virtual football field represent, in one or more non-limiting embodiment, examples of possible virtual practice locations 224. Thus, the user 204 can change virtual practice locations 224 by selecting a "change location 258" command (or the like) in the menu screen 228 of the group formation viewer application 202.

When the user 204 selects any of the instructions 282-258 available in the menu screen 228 or another component of group formation viewer application 202, the user 204 may use one or more input devices 108 including, but not limited to, a keyboard, mouse, or a touch screen, including a touch screen keyboard and selectors. Accordingly, user 204 can select or toggle on and off any of the features noted above with respect to group formation viewer application 202.

Turning to FIG. 3-FIG. 24, FIG. 3-FIG. 24 provide various exemplary pictorial illustrations of the various components and features of the group formation viewer application 202 as described above with respect to FIG. 1 and FIG. 2 and with respect to the augmented reality view 214 in particular.

Figure 3:
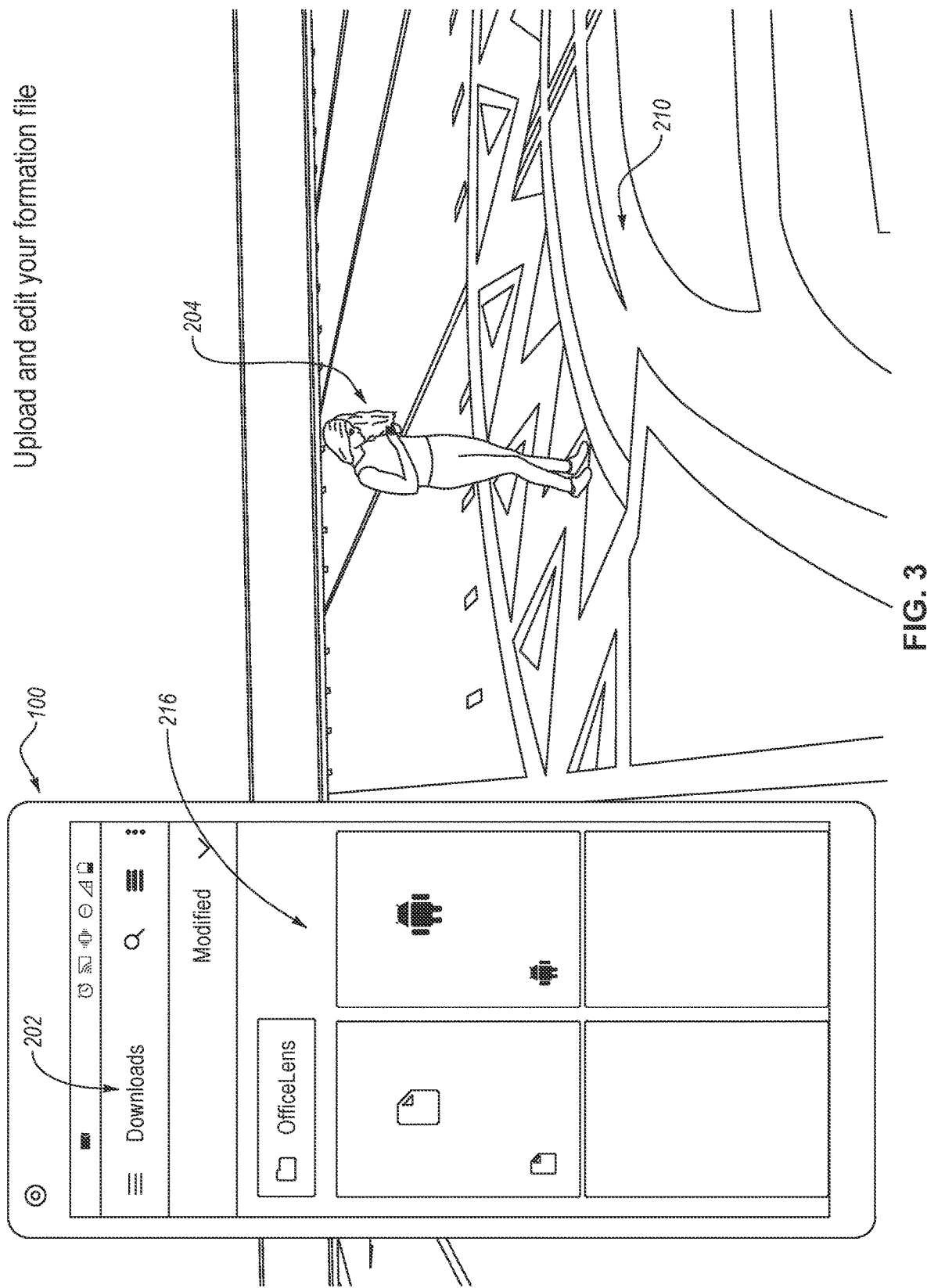
FIG. 3 is a pictorial illustration of an example display screen showing a group formation data file in accordance with an illustrative embodiment.

FIG. 3 is an example pictorial illustration illustrating that user 204 may load, upload (or download) a particular group formation data file 216 that is compatible with group application viewer formation 202. As noted above, group formation viewer application 202 may be a computer-based application that is accessible by and/or stored on user 204's computing device 100, including user 204's mobile computing device 100. In some embodiments, user 204 may also use group formation viewer application 202 to not only view, but also to edit the group formation data file 216 in order to vary the positions 220 in the formations 218. The group formation data file 216 may be written in any computer programming language that is accessible to and by group formation viewer application 202, including, but not limited to JSON (JavaScript Object Notation).

Turning to FIG. 4, FIG. 4 is a pictorial illustration of the augmented reality view 214 as selected by user 204 in the group formation viewer application 202 on the user 204's computing device 100. The augmented reality view 214 may present a user observed viewpoint 230 based on the user 204's real user environment 210. The user observed viewpoint 230 may be displayed on the display screen 110 of the computing device 100. One or more cameras 120 may be used in the computing device 100 to display the user observed viewpoint 230 of the real user environment 210 on the display screen 110 of the computing device 100. Accordingly, if a user selects or toggles the augmented reality view 214 (e.g., by selecting a command in the menu screen 228 as shown in FIG. 7 or another user interface), the user 204 may be presented with their immediate real-world surroundings as shown in FIG. 4.

In FIG. 4-FIG. 19, the user 204 is located in an outdoor football stadium, which corresponds to their real user environment 210, as described above with respect to FIG. 2. In this example scenario, user 204 may be a member of a group activity 208 such as marching band and is practicing his or her positions 220 in each drill formation 218 in the outdoor football field by viewing the augmented reality view 214 on their mobile computing device 100. Notably, user 204 may choose to practice in any indoor or outdoor location or real user environment 210. Ultimately, group formation viewer application 202 allows user 204 to practice anywhere that is convenient either with or without other group members 206.

Figure 5:
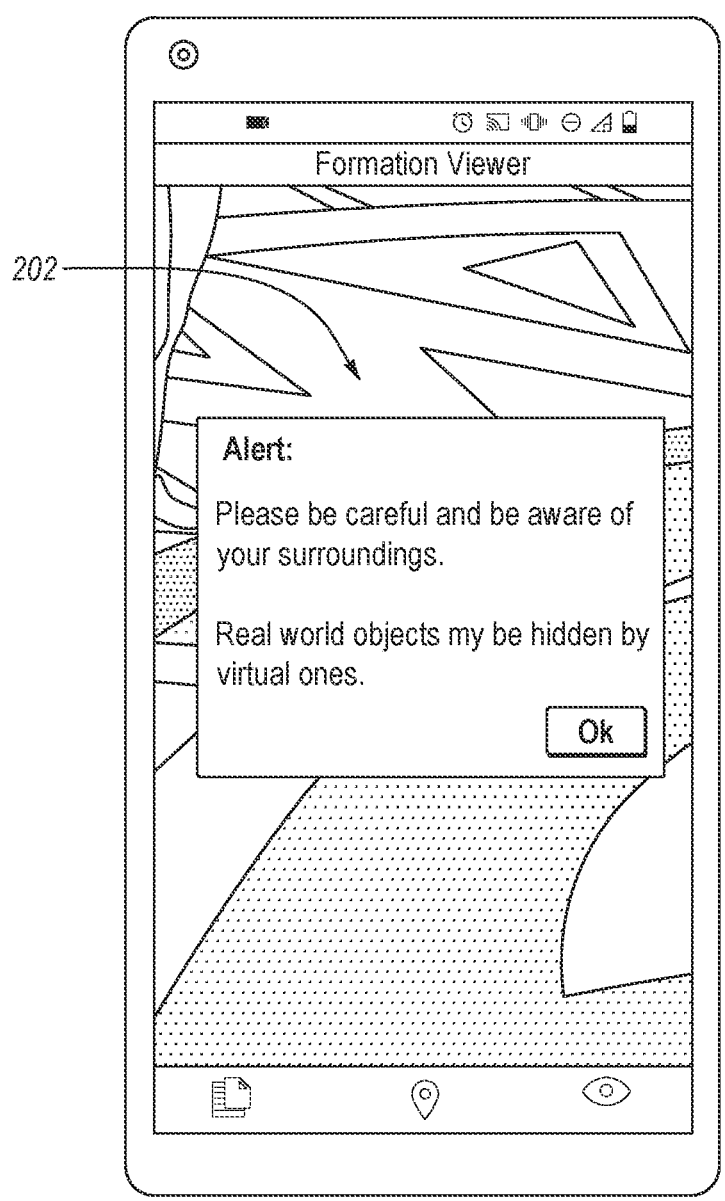
FIG. 5 is a pictorial illustration of an example display screen showing a notification instructional screen in a computer-based application on a computing device in accordance with an illustrative embodiment.

FIG. 5 shows an example alert that may be provided to user 204 to be aware while practicing their transitions and movements for each formation 218 in order for user 204 to be aware of their real-world surroundings 210 as the real world objects may sometimes be hidden by the virtual or augmented reality computer generated images used in the augmented reality view 214 that may be superimposed over the user observed viewpoint 230.

FIG. 6 is a pictorial illustration of a ground surface detection grid 240 that may appear to the user 204 when he or she initiates the augmented reality view 214. In one or more non-limiting embodiments, the ground surface detection grid 240 may appear when the user 204 initiates the augmented reality view 214 and may be part of the calibration process in order for the augmented reality view 214 screen to detect a flat ground surface. The ground surface detection grid 240 may appear, in one non-limiting embodiment, to be a series of dots interconnected in a grid over a ground surface that is superimposed over the user observed viewpoint 230 as displayed on the display screen 110 of user 204's computing device 100.

FIG. 7 is a pictorial illustration of an example menu 228, which includes a set of commands or instructions, including commands or instructions 282-258 as described above with respect to FIG. 2. The menu 228, as discussed above with respect to FIG. 2, may enable the user 204 to select one or more commands to execute an instruction and/or cause an effect in the augmented reality view 214 or the top-down view 212.

As shown in FIG. 7, menu 228 may also be used to select a starting position marker 236 in the augmented reality view 214. In FIG. 7, this command is displayed as "Toggle SP Marker" 244 whereby "Starting Position" is abbreviated to "SP" in this non-limiting example shown in FIG. 7. When the user 204 first initiates or activates the augmented reality view 214, the user 204 may use an input device 108 associated with computing device 100, such as without limitation, a keyboard, mouse, or a touch screen to tap on the screen and indicate the location of his or her starting position. The starting position corresponds to a first position that the user 204 is standing or otherwise positioned at in the real user environment 210 when he or she first uses the augmented reality view 214.

As shown in FIG. 8, the starting position marker 236 in one non-limiting example appears as an arrow on the display screen 110 of the computing device 100 that points to where the user 204 is standing or otherwise positioned in the real user environment 210. For example, if user 204 is located on a center yard line of the outdoor football field, when user 204 taps on her touchscreen 110 of her computing device 100, a starting position marker 236 appears in front of her on her display screen 110 while in the augmented reality view 214 that corresponds with her actual location in the outdoor football field (e.g., real user environment 210).

In one or more non-limiting embodiments, after indicating the user's 204 starting position by placing a starting position marker 236 on the display screen 110 of the computing device 100, the user 204 may select his or her assigned coordinate ID 222. The user 204 may have a coordinate ID 222 that is consistently associated with each one of her positions 220 for each selected formation 218. The coordinate ID 222 may be assigned to the user 204 and provided to the user 204 prior to opening or running group formation data file 216, such that the coordinate ID 222 is known to the user 204 in one or more non-limiting embodiments. As shown in FIG. 9, the user 204 may select the "Select Coordinate ID 246" command or instruction from the drop-down menu 228.

Turning to FIGS. 10-11, FIGS. 10-11 provide exemplary pictorial illustrations of the display screen that appears for entering and/or selecting the unique coordinate ID 222 assigned to user 204. As shown in FIG. 10, a list of coordinate IDs 222 available for each group member 206 as well as user 204 may be displayed in a drop-down type menu formation in one or more non-limiting embodiments. In one non-limiting embodiment, the coordinate IDs 222 are alphanumeric symbols, such as "A1" "B1" "C1" etc. Alternative types of symbols may be used in other embodiments for the coordinate IDs 222 associated with the user 204 and/or group members 206. In other embodiments, names of the users, including the user 204 and each group member 206, may be placed instead of alphanumeric symbols. In other embodiments, the title or label associated with a user in the group activity 208 may be included instead. For example, "First Flutist" may be used as a coordinate ID 222 if the group activity 208 is a marching band. Similarly, "Quarterback" may be used as a coordinate ID 222 if the group activity 208 is a football team or "Lead Dancer" if the group activity 208 is a dance team.

As shown in FIG. 11, the user 204 may enter her coordinate ID 222 in a selection box in one or more non-limiting embodiments. In the example shown in FIG. 11, the user 204 has chosen to enter "A2" as her tracked coordinate ID 222. In alternative embodiments, user 204 may not need to select a coordinate ID 222 or enter it into a selection box as shown in FIGS. 10-11. Rather, the group formation viewer application 202 may automatically select the correct coordinate ID 222 associated with user 204 and initiate the display of the corresponding positions 220 and positional graphical indicators 238 on user's 204 computing device 100.

Figure 12:
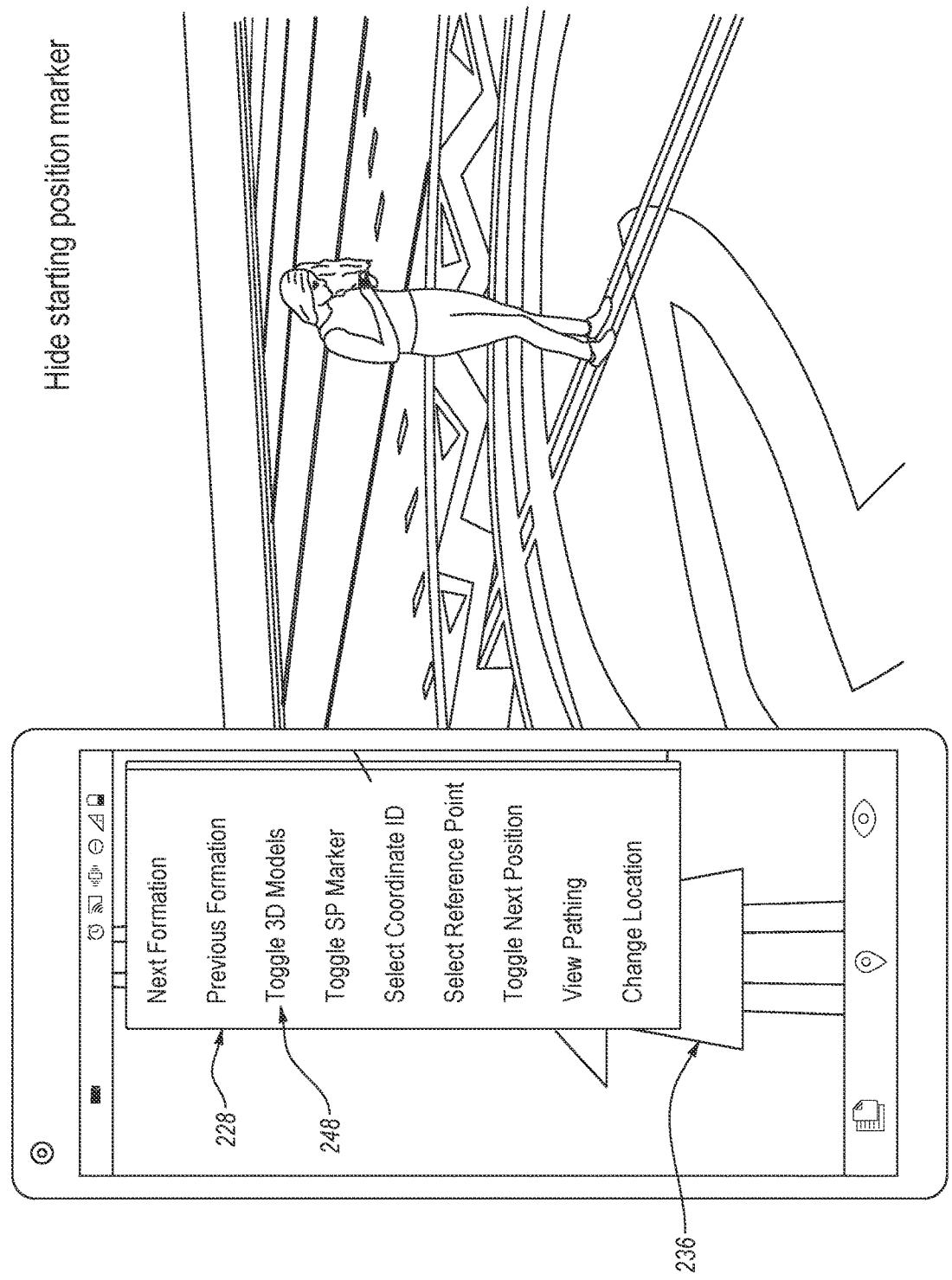
FIG. 12 is a pictorial illustration of an example display screen for hiding a starting position marker in accordance with an illustrative embodiment.

Continuing with FIG. 12, FIG. 12 shows an exemplary pictorial illustration illustrating that user 204 may hide the starting position marker 236 so that user 204 does not confuse the positional graphical indicators 238 that are to be displayed on user 204's computing device 100 in the augmented reality view 214 with the starting position marker 236.

FIG. 13 and FIG. 14 show example pictorial illustrations of positional graphical indicators 238 that may be displayed on the display screen 110 of the computing device 100 after the user 204's coordinate ID 222 is entered or otherwise indicated (e.g., as shown in FIG. 10-11). As shown in FIG. 13, the positional graphical indicator 238 is a computer-generated digital image that appears on the user observed viewpoint 230 as displayed on the computing device 100. The positional graphical indicator 238 directs the user 204 to the next position 220 that he or she should move to from the starting position based on the stored code in the group formation data file 216. In one or more non-limiting embodiments, positional graphical indicator 238 may be a clearly visible arrow that points to the first position 220 the user 204 should move to for his or her selected formation 218. Other types of symbols or graphical images may be used for the positional graphical indicators 238 superimposed over the user observed viewpoint 230 in alternative embodiments.

FIG. 14 shows an example of a pathing information 264 screen that may appear to the user 204 with further detailed information indicating how to proceed to the next position 220. As shown in FIG. 14, in one or more non-limiting embodiments, the pathing information 264 may be displayed in one or more text screen or dialogue boxes. Alternatively, in other embodiments, the pathing information 264 may be provided in other user interfaces or as part of the augmented reality view 214 over the positional graphical indicators 238. In a non-limiting example, FIG. 14 shows that the user 204 may proceed to their first position 220 in a direct manner as opposed to using any other type of special step or movement. Accordingly, pathing information 264 may include specific information about each movement and transition to a particular position 220 in the group formation 218. This may be particularly helpful with group activities 208 such as, but not limited to, marching band when practicing drill formations. This may also be particularly helpful if the group activity 208 relates to dance or sports, whereby the transitions between each movement involve specific actions and series of movements have certain labels, names, and specific techniques for the type of activity (e.g., "chasse" for a ballet routine).

Continuing with FIG. 15, FIG. 15 shows an example pictorial illustration of the transition to a position by user 204 in the real user environment 210. The pictorial graphical indicator 238 appears closer to the user 204 as displayed on the display screen 110 of the computing device 100 when the user 204 moves into position 220 as opposed to the view that appears to the user 204 in FIG. 13 when the user 204 was farther away from their assigned position 220 and was located at their starting position.

FIG. 16 shows a pictorial illustration of example 3D models 242 that may appear to the user 204 when using the augmented reality view 214. The 3D models 242 represent the positions of other group members 206 within the selected formation 218. In one non-limiting embodiment, the 3D models 242 may be toggled on and off using a command from the drop-down menu 228 (e.g., the command "Toggle 3D models 248" as shown in FIG. 2). Alternatively, the user 204 may tap on a touchscreen of the computing device 100 to make the 3D models appear and disappear in some embodiments or use his or her keyboard and/or mouse if the computing device 100 does not include a capacitive touchscreen. The 3D models 242 may be any type of graphical image or symbol. In a non-limiting embodiment, the 3D model 242 may be a graphical representation or depiction of each group member 206, including the user 204. Alternatively, the 3D model 242 may be a pillar (e.g., as shown in FIGS. 16-19) or any other image or symbol.

It is noted that user 204 is involved in the physical movements and transitions between one position 220 to another position 220 within the selected formation 218. Further, the user 204 may turn or pan his or her computing device 100 in any direction to view the various computer-generated digital images that appear on his or her screen 110. For example, to better view any 3D models 242 located near or adjacent to the user 204, the user 204 may turn the computing device 100 to the right or left direction and the 3D models 242 are displayed on either side of the user 204 on the display screen 110 of the computing device if that is the direction that corresponds to the assigned positions 220 of the other group members 206. User 204 may orient computing device 100 in any direction, including forward, backward, up, or down, such that any 3D models 242 representing the positions 220 of other group members 206 are displayed on the display screen 110.

Accordingly, the augmented reality view 214, as shown in FIG. 3-19 in non-limiting embodiments, superimposes the 3D models 242 in their corresponding positions (based on their tracked coordinate IDs 222) over the user observed viewpoint 230, such that the 3D models 242 appear in the display screen 110 of the user's 204 computing device 204 in any direction that the computing device 100 is oriented. It may also be helpful for user 204 to toggle between the top-down view 212 and the augmented reality view 214 so as to better understand his or her position 220 and the positions 220 of the other group members 206.

Turning to FIGS. 16-19, FIGS. 16-19 display example pictorial illustrations for selecting a different formation 218 from the one or more formations 218 stored in the group formation data file 216 and visible from the group formation viewer application 202. The user 204 may select another formation 218, in one or more non-limiting embodiments, by selecting a command such as "Next Formation 252" or "Previous Formation 254" from a menu such as the menu 228 shown in FIG. 7. In one or more non-limiting embodiments, the user 204 may not need to re-enter his or her coordinate ID 222 as it may be saved from the previous entry (e.g., as shown in FIG. 11). The positional graphical indicators 238 are superimposed in FIGS. 16-19 over the user observed viewpoint 230 to indicate where and how the user 204 should move to arrive at their designated positions 220 for the selected formation 218. As noted above, the user 204 may choose to view additional pathing information 264 (e.g., as shown in FIG. 14) to better understand how to move into position 220. FIG. 19 shows the 3D models 242 that may appear in the augmented reality view 214 to represent the other group members 206 and their respective positions 220 in the selected next formation 218.

Advantageously, FIGS. 4-19 show that the user 204 can follow the indicators (i.e., starting position maker 236 and positional graphical indicators 238) while viewing the group formation viewer application 202 on the user's computing device 100 in order to practice the group formation. Further, the user 204 is enabled to toggle through each position 220, using for example, "toggle next position 256" to go through each position 220 or step of the group formation.

Turning to FIG. 20-24, FIG. 20-24 are example pictorial illustrations of virtual practice locations 224 and the top-down view 212 that is also available for selection by user 204 when using the group formation viewer application 202.

Figure 20:
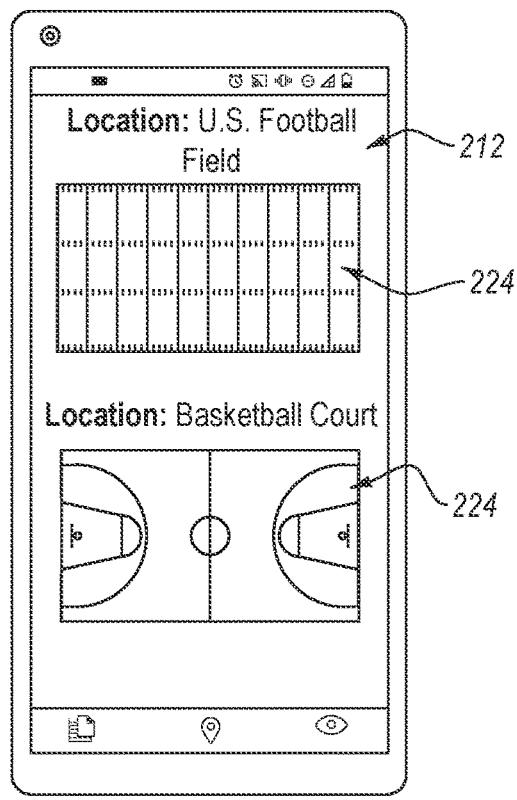
FIG. 20 is a pictorial illustration of selecting a virtual practice location in the top-down view in accordance with an illustrative embodiment.

FIG. 20 shows an example pictorial illustration of an example screen that may appear to the user 204 with the available virtual practice locations 224 available to the user 204, such as, but not limited to a virtual football field and a virtual basketball court. As noted above, top-down view 212 may be associated with any number or type of virtual practice locations 224. To change a location, user 204 may select on the "Change location 258" command that may be an available option in the menu 228 of the group formation viewer application 202 as shown in FIG. 2 and FIG. 7. FIGS. 21-24 display various formations 218 in the top-down view 212 in which it may be clearer to see that group members 206 and user 204 may be positioned in various formations 218 either in front of each other, behind each other, or to the side of each other. As noted above, an advantage of the group formation viewer application 202 is the ability to toggle between augmented reality view 214 and top-down view 212 at any point in time in the group formation 218 so the user may best understand his or her position 220 at any given point in time.

Figure 21:
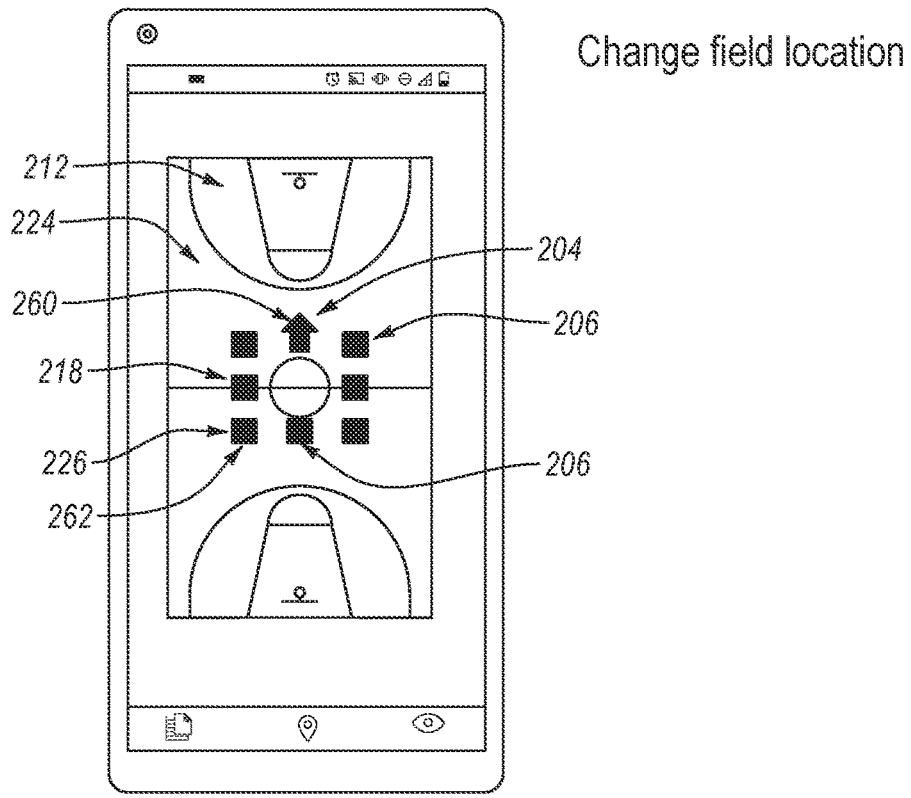
FIG. 21 is a pictorial illustration of a virtual basketball court with a display of a group formation and the user as graphical symbols in the top-down view in accordance with an illustrative embodiment.

FIG. 21 shows an example pictorial illustration of a virtual basketball court, which is a virtual practice location 224 that user 204 may have selected so that a formation 218 may be displayed on the virtual basketball court 224 in the bird's eye view or top-down view. As noted above, any playing surface may be provided and used in group formation viewer application 202, without limitation, to the ones displayed in FIGS. 21-24. Further, any group activity may use the group formation viewer application 202 whether the group members are in high school, college, or any other type of institution.

As shown in FIG. 21, the formation 218 is displayed as including a series of graphical symbols 226 (two dimensional as opposed to three dimensional) and the whole formation 218 is clearly displayed on the display screen 110 of the computing device 100. The user's 204 position 220 may be highlighted and identified with a unique positional graphical indicator 260 associated with user 204. In FIG. 21, the example positional graphical indicator 260 is an arrow and is associated with user 204, but those of ordinary skill in the art comprehend these are non-limiting examples. Group members 206 are associated with 2D models 262, which are also examples of graphical symbols 226, and indicate the specific positions 220 of the other group members 206 for any particular formation 218, as shown in FIG. 21 and also described above in FIG. 2.

FIGS. 22-24 provide an example pictorial illustration of another type of virtual practice location 224 visible in the top-down view 212. The virtual football field shown in FIGS. 22-24 may be a type of virtual practice location 224 of interest to user 204. In some embodiments, user 204 may engage in his or her group activity 208 in the selected virtual practice location 224.

FIGS. 22-24 show that formations 218 may require the user 204 and other group members 206 to move to different positions 220 to achieve the varied visual look and effect for each formation 218 on the virtual football field (e.g., virtual practice location 224). For example, in FIG. 22, the formation 218 with the user 204 and the other group members 204 is shown as being in an octagon shaped formation. In FIG. 23, the formation 218 with the user 204 and the other group members 206 is shown as being in a square shaped formation. In FIG. 24, the formation 218 and the respective positions 220 of the user 204 and the other group members 206 is shown as being as straight line. A positional graphical indicator 260 is assigned to the user 204 and shown in each view in FIGS. 22-24 to indicate the appropriate position 220 for the user 204 at that given point in time in the group activity 208 and formation 218. Accordingly, the top-down view 212 may provide to the user 204 a unique understanding of the shape and structure of the formation 218 as a whole in order to better understand his or her unique position 220 for each formation 218 with respect to the other group members 206.

The use of the top-down view 212 in conjunction with the augmented view 214 may allow the user 204 to master the skill and artistry and techniques needed to perform the group activity 208. Accordingly, it is intended that user 204 may easily toggle or switch between the top-down view 212 and the augmented reality view 214 as desired by the user 204 at any time using the group formation viewer application 202.

In one or more non-limiting embodiments, the names of each group member 206 may be toggled on and off over the 2D models 262 in the top-down view 212 or over the 3D models 242 in the augmented reality view 214. This may allow user 204 to comprehend which group member 206 is positioned closest to the user 204 and their overall positions.

Figure 25:
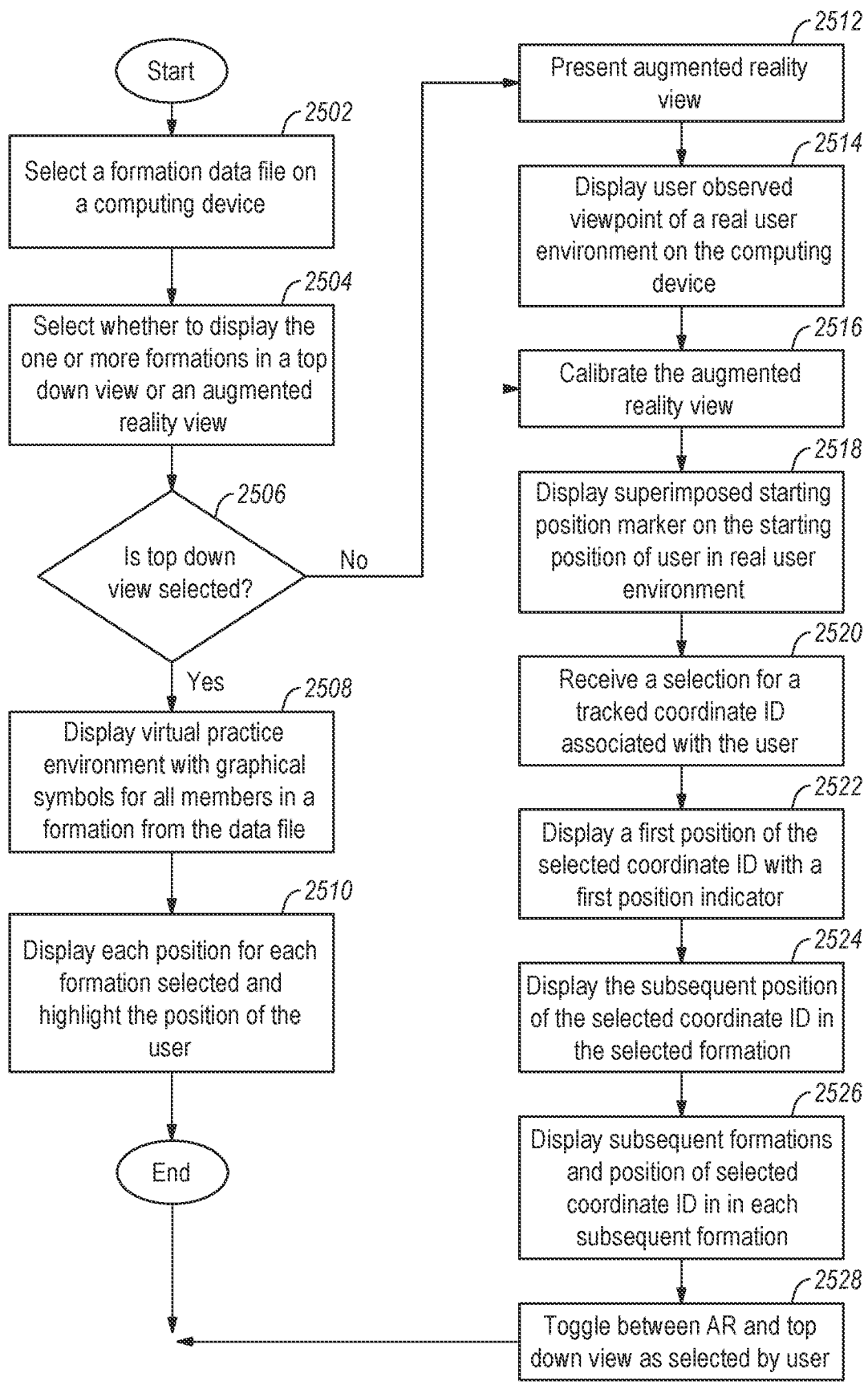
FIG. 25 is a flowchart of an exemplary method of use of a group formation computer=based application in accordance with an illustrative embodiment.

FIG. 25 may provide an example flowchart for a method of how to use the group formation viewer application 202. In one or more non-limiting embodiments, the exemplary method may be implemented using one or more components of computing device 100 as described above with respect to FIGS. 1-24.

At step 2502, the process may begin with selecting a formation data file, such as group formation data file 216, on a user computing device (e.g., computing device 100). At step 2504, the process may continue with a selection whether to display the one or more formations available from the group formation data file 216 in a top-down view (e.g., top-down view 212) or an augmented reality view (e.g., augmented reality view 214). At step 2506, the determination is made whether the top-down view 212 is selected. If the top-down view 212 is selected, then a virtual practice location 224 having one or more graphical symbols (e.g., graphical symbols 226 as shown in FIG. 2 and FIG. 22-24) may be displayed for each member 206 of a group activity 208 in the selected formation 218 from the data file 216 (step 2508). Next, while in the top-down view 212, each position of the user 204 may be displayed with the position 220 of the user 204 highlighted (e.g., via a positional graphical indicator 260 as shown in FIGS. 22-24) in order to have the user 204 stand out from among the other symbols (e.g., 2D models 262) used to represent the other group members 206 in the formation 218. (at step 2510).

If the top-down view 212 was not selected, then the augmented reality view 214 may be initiated or presented instead to the user 204. At step 2514, the user observed viewpoint 230 of a real user environment 210 may be displayed to the user on the display screen 100 of the user 204's computing device 100.

At step 2516, the augmented reality view may require calibration. As noted above, the user 204 may see a ground surface detection grid 240 as shown in a non-limiting example in FIG. 6 that appears to the user as part of the calibration process. Further, the user 204 may need to indicate their starting position as further explained in the next step.

At step 2518, a display of a starting position marker (e.g., starting position marker 236) that corresponds with the starting position of user 204 may be superimposed over the user observed viewpoint 230 on the display screen 110 of the computing device 100, as shown in FIG. 6 and FIG. 7. The user may need to indicate their starting position using their touchscreen or a keyboard and mouse in order to calibrate the group formation viewer application 202 in some non-limiting embodiments.

At step 2520, the process may continue with receiving a selection for a tracked coordinate ID 222 associated with the user 204, as shown in FIGS. 9-22. At step 2522, the process may continue with displaying a first position of the selected coordinate ID (e.g., coordinate ID 222) with a first position indicator (e.g., positional graphical indicator 238). If there are additional positions 220 for the user to transition to in the selected formation 218, the process may display the subsequent positions 220 in the selected formation 218 for the user 204 based on the associated coordinate ID 222 (at step 2524).

In some cases, there may be additional formations 218 stored on the group formation data file 216 that the user 204 may want to also view using the group application viewer application 202. Accordingly, at step 2526, the process may continue with displaying subsequent formations 218 and positions 220 based on the selected coordinate ID 222 for the subsequent formations 218. At step 2528, a user is enabled to toggle between the augmented reality (AR) view 214 and the top-down view as desired by user 204 in order to view the group formations 218 as either two dimensional graphical symbols 226 or using augmented reality view 214 while in a real user environment 210 in order to view the user's 204 starting position marker 236 or any other positional graphical indicators 238 and 3D models 242 of the other group members 206.

Accordingly, the group formation viewer application 202 as described in one or more non-limiting embodiments provides many benefits and advantages to the user. The augmented reality view (AR) duplicates the user's physical environment and provides simulated three-dimensional (3D) objects to act as the other group members. Such a feature may allow a user to become more sensitive to the positioning of the group as a whole and to their own individual movements and transitions in each formation. Further, the ability to toggle between the augmented reality view and top-down view in response to a selection from the user provides a much better understanding of the required movements of the user in spatial reality in a real world environment between each position.

Currently available software programs that users may use to view group formations fail to provide this sense of spatial reality and accuracy in order for the user to better understand his or her position and transitioning between each step in the group formation. This may be particularly helpful with a marching band whereby users have to carry instruments, play music, and keep track of their spacing and position at any given point in time. This is also particularly true for dance members in a dance troupe or any other member of a group activity. The ability to practice a user's steps and to view each step or position of the other group members in a group formation using augmented reality and toggling back and forth, if needed, from a top-down view to an augmented reality view, from any location using one's computing device is extremely advantageous and not currently available. Accordingly, the implementations of the group application viewer application 202, as described in one or more non-limiting embodiments above are numerous. Additional advantages and benefits are foreseeable to one of ordinary skill in the art and are within the scope of the invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for a group formation viewer application for practicing group formations for a group activity using augmented reality, the system comprising:
    a single computing device having a display screen;
    one or more memory; and
    one or more processors configured to:
        select a group formation data file on the single computing device;
        display one or more formations contained in the group formation data file in a top-down view or an augmented reality view responsive to a selection from a single user using the single computing device;
        if the top-down view is selected, displaying the top-down view further comprising:
        display a virtual practice location;
        display graphical symbols that represent a position for each group member in a selected formation from the group formation data file in the virtual practice location;
        display each position of the single user for the selected formation in the top-down view in relation to a position for the other group members in the virtual practice location; and
        provide options for multiple backgrounds in the top-down view that are selectable that display each position of the single user and display each position of other members of the selected formation;
        if the augmented reality view is selected, display the augmented reality view further comprising:
        display a user observed viewpoint of a real user environment on the display screen of the single computing device;
        display a starting position marker on a starting position of the single user on the display screen of the single computing device as obtained from the selected formation from the group formation data file;
        track a position associated with the single user;
        display a positional graphical indicator for each position associated with the single user for the selected formation in the augmented reality view in the real user environment, wherein the single user is enabled to practice each step of the selected formation in any real user environment using the augmented reality view, wherein the group data formation file stores and displays positional graphical indicators of each group member without using geolocation or location based systems to display a position of each group member in the augmented reality view on the single computing device for the single user;
        display a 3D model or other symbol representing a position for each group member in the group formation, wherein the 3D model or other symbol is superimposed over the real world environment on the display screen of the single computing device, further comprising, displaying the 3D model or other symbol representing each group member upon panning in any direction;
        display pathing information containing instructions how to proceed to a next position, wherein the pathing information comprise instructions for transitions and specific movements from a first position to a second position in the group formation; and
        toggle between the augmented reality view and the top-down view in response to a selection from the single user.

2. The system of claim 1, further comprising, calibrating the augmented reality view to detect a ground surface.

3. The system of claim 1, further comprising, changing a selected virtual practice location to another available virtual practice location in the top-down view.

4. The system of claim 1, further comprising, displaying a different formation from the selected formation that is available in the group formation data file.

5. The system of claim 1, wherein the selected formation comprises defined sets of positions and movements for each member of the group at a given point in time for a particular routine of the group activity.

6. The system of claim 1, wherein tracking a position associated with the single user further comprises:
    receiving a selection for a user specific coordinate ID, wherein the user specific coordinate ID matches each position for the single user as specified in the selected formation from the group formation data file.

7. The system of claim 1, further comprising, toggling on or off names or titles of each member of the selected formation in both the top-down view and the augmented reality view.

8. A computer implemented method for practicing group formations for a group activity using augmented reality, the computer implemented method comprising:
    receiving a selection for a formation data file on a single computing device, wherein t formation data file comprises one or more group formations that can display a top-down view or an augmented reality view on the single computing device for a single user;

receiving a selection from the single user to display the one or more group formations in a top-down view or in an augmented reality view;

if the top-down view is selected, displaying the top-down view, further comprising:

displaying a virtual practice location on a display device of the single computing device, wherein the virtual practice location comprises a computer-generated image of a virtual location;

displaying the virtual practice location with a selected formation of the one or more group formations from the formation data file, wherein each group member in the selected formation is represented as graphical symbols and displayed in the selected formation on the display device of the single computing device; and displaying a positional graphical indicator for the single user in the selected formation for each position of the single user; and provide options for multiple backgrounds in the top-down view that are selectable that display each position of the single user and display each position of other members in the selected formation;

if the augmented reality view is selected, presenting the augmented reality view on the display device of the single computing device, further comprising:

displaying a user observed viewpoint of a real user environment using a camera included with or associated with the single computing device;

displaying a starting position marker, wherein the starting position marker corresponds with an initial location of the single user in the real user environment, wherein the starting position marker is a graphical image superimposed over the real user environment;

receiving a selection for a coordinate ID, wherein the coordinate ID corresponds with a tracked position of the single user throughout the one or more group formations;

displaying a first position of the selected coordinate ID, wherein a positional graphical indicator is displayed over the user observed viewpoint of a real user environment, wherein the positional graphical indicator marks a position of the single user in the selected formation, wherein the single user is enabled to practice each step of the selected formation in any user environment using the augmented reality view;

wherein the group data formation file stores and displays positional graphical indicators of each group member without using geolocation or location based systems to display a position of each group member in the augmented reality view on the single computing device for the single user; and upon selection by the single user to display a subsequent position of the selected coordinate ID, displaying the subsequent position of the selected coordinate ID and the single user in the selected formation;

displaying a 3D model or other symbol representing a position for each group member in the group formation, wherein the 3D model or other symbol is superimposed over the real user environment on the display screen of the single computing device, further comprising, displaying the 3D model or other symbol representing each group member upon panning in any direction;

displaying pathing information containing instructions how to proceed to a next position, wherein the pathing information comprise instructions for transitions and specific movements from a first position to a second position in the selected formation; and toggling between the augmented reality view and the top-down view, wherein a position of the selected coordinate ID is provided in either the augmented reality view or the top-down view for each formation of the one or more formations.

9. The computer implemented method of claim 8, further comprising, calibrating the augmented reality view to detect a ground surface.

10. The computer implemented method of claim 8, further comprising, changing a selected virtual practice location to another available virtual practice location in the top-down view.

11. The computer implemented method of claim 8, further comprising, displaying another formation from the one or more group formations that is available in the group formation data file.

12. The computer implemented method of claim 8, further comprising, wherein the selected formation comprises defined sets of positions and movements for each member of the group at a given point in time for a particular routine of the group activity.

13. The computer implemented method of claim 8, further comprising, toggling on or off names or titles of each member of the selected formation in both the top-down view and the augmented reality view.

* * * * *